United States Patent
Iyer et al.

(10) Patent No.: US 10,623,246 B1
(45) Date of Patent: Apr. 14, 2020

(54) DEVICE CONFIGURATION BY NATURAL LANGUAGE PROCESSING SYSTEM

(71) Applicant: Amazon Technologies, Inc., Seattle, WA (US)

(72) Inventors: Hersh Sridhar Iyer, Seattle, WA (US); Willy Lew Yuk Vong, Seattle, WA (US); Venkatesh Krishnamoorthy, Bothell, WA (US); Gregg Taylor Lehman, Seattle, WA (US); Ramesh Kamasamodram, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 86 days.

(21) Appl. No.: 15/937,727

(22) Filed: Mar. 27, 2018

(51) Int. Cl.
*H04L 29/06* (2006.01)
*H04L 12/24* (2006.01)
*G10L 15/22* (2006.01)
*H04W 8/00* (2009.01)
*H04W 76/14* (2018.01)

(52) U.S. Cl.
CPC .......... *H04L 41/0806* (2013.01); *G10L 15/22* (2013.01); *H04W 8/005* (2013.01); *H04W 76/14* (2018.02); *G10L 2015/223* (2013.01)

(58) Field of Classification Search
CPC ...... H04W 76/14; H04W 8/005; G10L 15/22; G10L 2015/223; H04L 41/0806
See application file for complete search history.

(56) References Cited

U.S. PATENT DOCUMENTS

| | | | | |
|---|---|---|---|---|
| 9,711,143 | B2 * | 7/2017 | Kennewick | G10L 15/1822 |
| 10,187,870 | B1 * | 1/2019 | Achamola | H04W 68/005 |
| 2013/0124207 | A1 * | 5/2013 | Sarin | G10L 15/22 704/275 |
| 2016/0132293 | A1 * | 5/2016 | Ballinger | G10L 15/30 704/8 |
| 2017/0236512 | A1 * | 8/2017 | Williams | G06F 16/68 381/79 |
| 2018/0233131 | A1 * | 8/2018 | Aleksic | G10L 15/07 |
| 2019/0149584 | A1 * | 5/2019 | DiBello | H04L 12/1822 |

* cited by examiner

*Primary Examiner* — Lan-Huong Truong
(74) *Attorney, Agent, or Firm* — Lee & Hayes, P.C.

(57) ABSTRACT

Systems and methods for device control by a natural language processing system are disclosed. A user may desire to utilize a voice-enabled device to associate an accessory device with a hub device without having to utilize third-party software associated with the accessory device and/or the hub device. The user may provide a user utterance to associate the accessory device with the hub device. Audio data corresponding to the user utterance may be analyzed and utilized to generate and send directive data to a third-party remote system to transition the hub device to a join mode. Upon association completion, audio may be output confirming that the association has been established successfully.

20 Claims, 8 Drawing Sheets

US 10,623,246 B1

DEVICE CONFIGURATION BY NATURAL LANGUAGE PROCESSING SYSTEM

BACKGROUND

Smart home devices are becoming more ubiquitous. Some smart home devices, such as light bulbs, light switches, and locks, for example, operate in association with a hub device, which may be located in the environment that the smart home device is located. Described herein are improvements in technology and solutions to technical problems that can be used to, among other things, facilitate the association of smart home devices with a hub using speech recognition technology.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
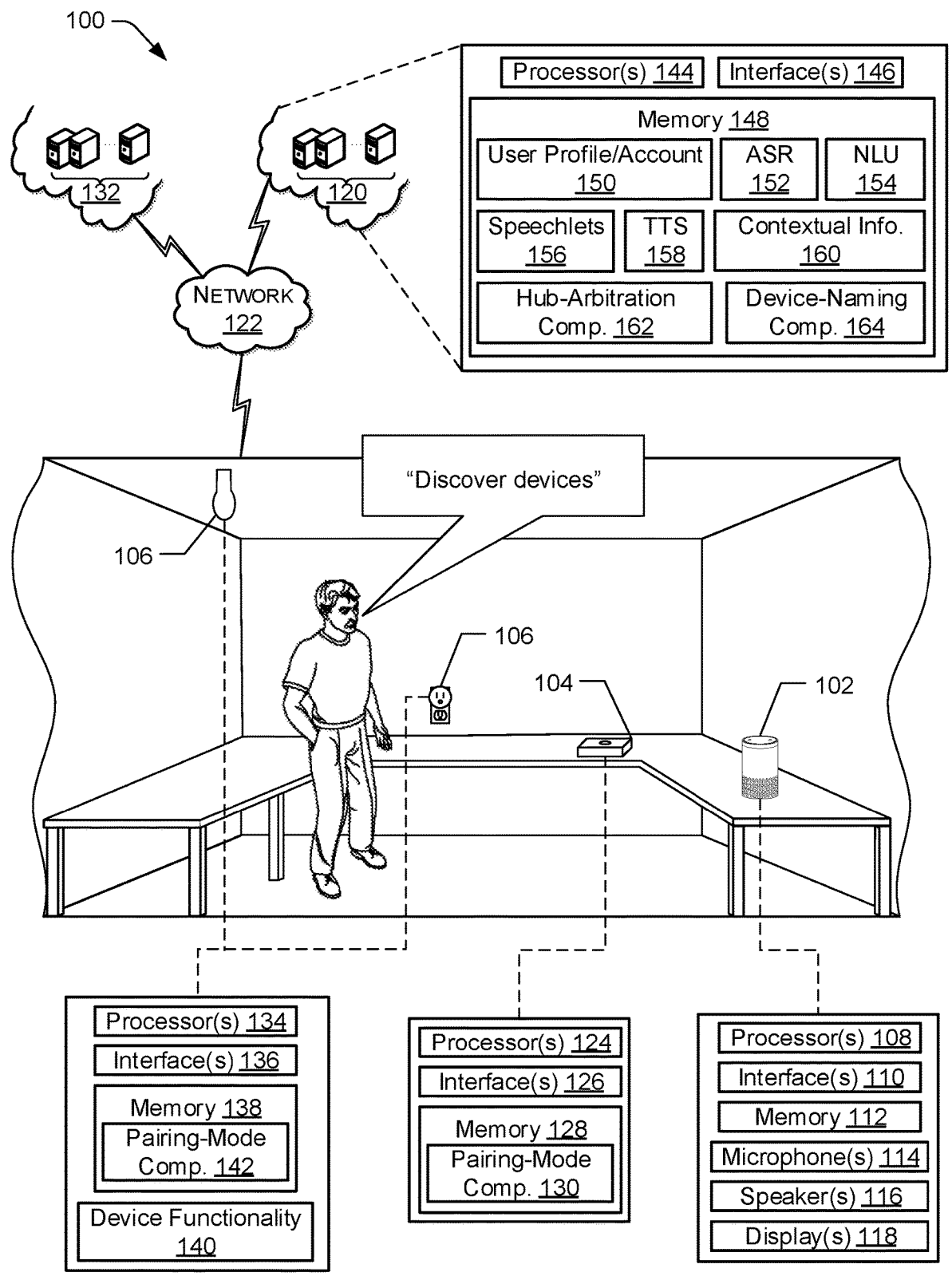
FIG. 1 illustrates a schematic diagram of an example environment for device control by a natural language processing system.

Systems and methods for device control by a natural language processing system are described herein. Take, for example, an environment, such as a home, that includes a natural language system, which may include a voice-enabled device. A user may desire to setup and use one or more "smart" devices via voice commands provided to the voice-enabled device. For example, the user may desire to utilize one or more smart plugs, light bulbs, light switches, locks, remote controls, etc. In addition to, or instead of, operating these devices via tactile input on the devices themselves and/or via input to a mobile device, such as a mobile phone, the user may desire to operate the smart devices using voice commands provided to the voice-enabled device. User utterances to operate the smart devices may include, for example, "turn on the kitchen light," "dim the office lights," or "unlock the front door."

To enable the voice-enabled device to respond to these user utterances and operate the smart devices as the user intends, the smart devices may be set up to interact with the voice-enabled device and/or speech processing system, such as Amazon's Alexa Speech Processing System. In some instances, the smart devices may be associated with a smart-home hub device, which may be referred to as a "home controller," gateway, and/or other type of "hub," and may assist in controlling associated smart devices. In these examples, when a smart device is added, it must be paired to the hub device, typically by following instructions to physically place the smart device and the hub device into a join mode, which may also be described as a pairing mode, and/or by utilizing a hub-associated application stored on and/or accessed by a web and/or mobile phone. Once the smart device is paired to the hub device, the voice-enabled device then determines that the smart device has been paired to the hub device and is a device that can be operated via user utterances received by the voice-enabled device. This process may requires the user to request, through input into a second application associated with the voice-enabled device and/or through voice commands to the voice-enabled device, the voice-enabled device to "discover" the paired smart device. Discovering the smart device may include identifying the smart device and authenticating the smart device as being voice enabled with a third-party system that controls the smart device and the hub device. Authentication may include the exchange of credentials, such as via tokens, between the remote system and the third-party system.

However, this setup can be improved by enabling the user to setup a smart device using voice commands and/or with fewer interactions as compared to current solutions. The present disclosure provides systems and methods to allow for voice-enabled setup of smart devices without the need to input information via multiple applications stored on and/or accessed by a mobile device. For example, a voice-enabled device and a hub device may be in a user's home. The voice-enabled device may have been configured to communicate with the hub device, such as by sending and/or receiving data via the remote system associated with the voice-enabled device and the third-party remote system associated with the hub device. When the user desires to add a new smart device, the user may provide a user utterance to the voice-enabled device to add the smart device to the user's network. The user utterance may be, for example "discover the new device," "discover devices," and/or "discover new smart plug." Then, the user may plug the smart device in, and/or otherwise install the smart device and/or put the smart device into a join mode. Putting the smart device into a join mode may include, for example, powering the device on and/or actuating components of the smart device.

One or more microphones of the voice-enabled device may capture audio corresponding to the user utterance and may generate corresponding audio data. The audio data may be sent to the remote system for automatic speech recognition and natural language understanding processing. For example, the automatic speech recognition processing may generate text data corresponding to the user utterance, and the natural language understanding processing may generate intent data corresponding to the text data and indicating that the user desires to associate a new device for voice enablement. A determination may be made that the voice-enabled device is already associated with a hub device and that the voice-enabled device is enabled to communicate with the hub device. For example, a "skill" may have been enabled via the voice-enabled device and/or an application associated with the voice-enabled device that allows the voice-enabled device to communicate with the hub device. As used herein, "skill" may refer to a hub-associated application and/or functionality and/or capabilities that are downloaded and/or made accessible by the voice-enabled device. For example, a hub device may have an application and/or a service associated with it that may be utilized via the voice-enabled device and/or a personal device, such as a mobile phone. A user of the hub device may download or otherwise gain access to the application and/or service by authenticating the hub device and/or associating the hub device with one or more other devices and/or accounts.

In these examples where the voice-enabled device is associated with the hub device and is enabled to communicate with the hub device, the remote system associated with the voice-enabled device may generate directive data and send that directive data to a third-party remote system associated with the hub device. The directive data may indicate that a request to associate a new device has been received and requesting that the third-party remote system cause the hub device to enter into a join mode and/or otherwise begin the process of pairing the new smart device to the hub device. The third-party remote system may send instructions to the hub device to enter into the join mode and pairing may be performed between the new smart device and the hub device, in certain examples. Once paired, the hub device may send confirmatory data to the third-party remote system, which may send confirmation data to the remote system associated with the voice-enabled device. Additionally, the third-party remote system may send an identifier of the smart device. The identifier may be a unique identifier, such as a combination of letters and/or numbers, and/or the identifier may include a naming indicator determined by the third-party remote system. Naming indicators may include, for example, "Smart Plug 1," "Rob's Smart Plug," "Kitchen Light," etc.

The remote system associated with the voice-enabled device, having received the confirmation data that the smart device has been paired, may generate audio-output directive data and may send this directive data to the voice-enabled device. The voice-enabled device, having received the directive data, may perform an action based at least in part on the directive data. For example, the directive data may instruct the voice-enabled device to output audio confirming that the smart device has been paired and/or otherwise set up. For example, the output audio may include "your Smart Plug 1 has been set up" and/or "device paired," and/or "setup successful." Additionally, or alternatively, the directive data may instruct the voice-enabled device to output audio instructing the user to provide a user utterance to test that the smart device is working. For example, the output audio may include "try saying 'Turn off Smart Plug 1." In these examples, the user may provide another user utterance that corresponds to the instructions to test that the smart device was installed properly.

Additionally, or alternatively, the voice-enabled device may be associated with more than one hub device. For example, the environment in which the voice-enabled device is situated may include smart devices that operate in connection with a first hub device and smart devices that operate in connection with a second hub device. By way of example, the user may have smart locks that operate in connection with a first hub device and smart plugs that operate in connection with a different hub device. In these examples, the remote system may perform hub arbitration processes to determine which hub device to associate with the new smart device. For example, when the user provides the user utterance to set up the smart device, the user utterance may include an indication of which hub device to use, such as "discover my smart plug," "discover new devices in kitchen," "discover [brand name device]," "discover new devices for Hub 1," etc. The user utterance may be analyzed, via automatic speech recognition and natural language understanding, for example, to identify portions of the user utterance that indicate which hub device to associate the smart device with. For example, a user utterance including an indication of the device type of the smart device, such as "plug" and/or "lock," may indicate that the smart device has a device type that is associated with one hub device but not other hub devices. Additionally, or alternatively, the user utterance may include an indication of the physical location of the smart device, which may be utilized to select a hub device that is closest to the physical location and/or a hub device that is assigned to and/or is associated with the physical location. Additionally, or alternatively, the user utterance may include the brand name and/or developer name associated with the smart device. The hub device with the same or similar brand name and/or developer name may be selected to be paired to the smart device. Additionally, or alternatively, the user utterance may include an indication of the hub device the user desires to associate the smart device with. For example, the user utterance may include a name indicator for the hub device. Additionally, or alternatively, a user may provide an indication, which may be prior to setting up the smart device, as to which hub device is a default hub device.

In other examples, such as when the user utterance does not provide an indication of which hub device to associate the smart device with, audio may be output by the voice-enabled device that requests additional information from the user to determine which hub device to utilize. For example, the audio may instruct the user to provide a naming indicator for the desired hub device and/or to provide a naming indicator for the smart device. This information may be utilized to select a hub device.

Additionally, or alternatively, the remote system associated with the voice-enabled device may identify, determine, and/or generate a naming indicator for the smart device, once paired. For example, when confirmatory data is sent by the third-party remote system to the remote system indicating that pairing has been completed, the third-party remote system may only send a device identifier of the smart device such as a media access control (MAC) address. In these examples, it may be desirable to identify and/or determine a "friendly" name for the device that may be utilized by the remote system and/or the user to operate the device. Examples of friendly names may include "hallway light," "front door lock," etc. To identify and/or determine a friendly name for the device, the remote system may utilize contextual information associated with the device. For example, the contextual information may include device location data indicating a location of the smart device within an environment. The device location data may be utilized to identify the smart device as, for example, "kitchen light" and/or "front door lock."

Additionally, or alternatively, the contextual data may include device association data that indicates an identifier of another device within the environment. For example, if the smart device is located within the same room as other devices, the naming indicators of the other devices may be utilized to inform identification of the smart device name.

By way of example, if the other devices within the environment include naming indicators such as "microwave," "refrigerator," and "coffee maker," the smart device is likely located in a kitchen and can be named accordingly, such as "kitchen light." Additionally, or alternatively, the contextual information may include device type data that may indicate a device type of the smart device. For example, the device may be a "plug," "light bulb," "lock," etc. This information may be utilized in identifying the naming indicator for the device. In addition to, or instead of, utilizing contextual information to name the device, additional information may be requested from the user, such as via audio output by the voice-enabled device, and that additional information may be utilized to name the device.

Additionally, or alternatively, one or more actions may be required by the user to initiate and/or complete pairing. These actions may include, for example, identifying the smart device to be paired, physically putting the smart device into a join mode, turning the smart device on, plugging the smart device in and/or otherwise installing the smart device, and/or plugging in the hub device. The remote system may be configured to generate directive data to be sent to the voice-enabled device to output audio instructing the user to perform these one or more actions to assist in pairing the smart device to the hub device.

Additionally, or alternatively, the remote system may be configured to receive device-association data from the third-party remote system without the user requesting the voice-enabled device to discover the smart device. For example, a user may decide to associate the smart device with the hub device utilizing a third-party application provided by the developer of the smart device and/or the hub device. However, this pairing process, which may also be referred to as a discovery process, may not include voice enabling the smart device via the voice-enabled device. The third-party remote system, having received confirmation data indicating that the smart device has been paired to the hub device, may send device-association data to the remote system associated with the voice-enabled device. The remote system, having received the device-association data, may associate the smart device with the voice-enabled device such that user utterances to control operation of the smart device may be received, analyzed, and executed.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated and/or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example system 100 for device control by a natural language processing system. The system 100 may include, for example, a voice-enabled device 102. The voice-enabled device 102 may be, for example, a voice-controlled device that may capture user utterances and perform one or more actions based at least in part on those user utterances. The voice-enabled device 102 may be configured to accept other forms of input in addition to user utterances, and the voice-enabled device 102 may be a personal device and/or a communal device. The system 100 may additionally, or alternatively, include a hub device 104. The hub device 104 may communicate with and/or control operation of one or more accessory devices 106, which may be described herein as smart devices. As shown in FIG. 1, the accessory devices 106 include a smart plug and a smart light. However, the accessory devices 106 may include any device having a processor and memory utilized to perform an action. The voice-enabled device 102, hub device 104, and/or accessory devices 106 may be situated within an environment, here shown as a room. As used herein, the term "environment" means a given area. Non-limiting examples of environments may be, for example, a room, a house, an office, a place of business, an apartment, a car, a train, an airplane, and/or an outdoor space.

The voice-enabled device 102 may include components such as, for example, one or more processors 108, one or more network interfaces 110, memory 112, one or more microphones 114, one or more speakers 116, and/or one or more displays 118. The microphones 114 may be configured to capture audio, such as user utterances, and generate corresponding audio data. The speakers 116 may be configured to output audio, such as in response to receiving audio data and/or directive data from a remote system 120 via a network 122. The displays 118 may be configured to visually present information to a user.

The hub device 104 may include components such as, for example, one or more processors 124, one or more network interfaces 126, and memory 128. The memory 128 may include one or more components, such as a pairing-mode component 130. The pairing-mode component 130 may transition the hub device into and out of a join mode. The join mode may be utilized to associate one or more of the accessory device 106 to the hub device 104. The hub device 104 may communicate, such as via the network 122, with a third-party remote system 132. The third-party remote system 132 may send data and/or instructions to the hub device 104 to cause the hub device to transition into and out of the join mode using the pairing-mode component 130. Pairing may be described herein as registering and/or coupling an accessory device 106 to a hub device 104 such that the accessory device 106 may send data to and receive data from the hub device 104.

The accessory devices 106 may each include components such as, for example, one or more processors 134, one or more network interfaces 136, memory 138, and other device functionality 140. The memory 138 may include one or more components, such as a pairing-mode component 142. The pairing-mode component 142 may be the same as or similar to the pairing-mode component 130 described with respect to the hub device 104. The pairing-mode component 142 may additionally perform the same or similar functions as the pairing-mode component 130 described with respect to the hub device 104. The accessory devices 106 may be configured to communicate and/or exchange data with the hub device 104 and/or the voice-enabled device 102 directly and/or via the network 122. For example, the accessory devices 106 may send and receive data directly with each other and/or via the hub device 104 and/or via the voice-enabled device 102. Additionally, or alternatively, the accessory devices 106 may send data to and receive data from other accessory devices 106, the hub device 104, and/or the voice-enabled device 102 via the network 122.

The device functionality 140 of the accessory device 106 may include one or more components that enable the accessory devices 106 to perform operations and/or functions other than sending and/or receiving data. For example, the device functionality 140 may include supplying power to an appliance, illuminating a light, locking and/or unlocking a lock, etc.

Additionally, the system 100 may include the remote system 120, which may be configured to receive and send data between the remote system 120, the voice-enabled device 102, the hub 104, the accessory devices 106, and/or the third-party remote system 132, for example. The remote system 120 may include components such as, for example, one or more processors 144, one or more network interfaces 146, and memory 148. The components of the memory 148 may include, for example, a user profile/account component 150, an automatic speech recognition (ASR) component 152, a natural language understanding (NLU) component 154, one or more speechlets 156, a text-to-speech (TTS) component 158, a contextual-information component 160, a hub-arbitration component 162, and/or a device-naming component 164. The components of the memory 148 are described in detail below.

The user profiles/accounts component 150 may be configured to identify, determine, and/or generate associations between users, user profiles, user accounts, and/or devices. For example, one or more associations between the voice-enabled device 102, the hub device 104, the accessory devices 106, environments, networks 122, users, user profiles, and/or user accounts may be identified, determined, and/or generated by the user profile/account components 150. The user profile/account component 150 may additionally store information indicating one or more applications accessible to and/or enabled for the voice-enabled device 102 and/or the hub device 104 and/or the accessory devices 106. It should be understood that the devices may be associated with one or more other personal devices, one or more applications stored on and/or accessible by the devices, and/or one or more users. It should also be understood that that a user account may be associated with one or more than one user profiles.

The ASR component 152 may be configured to receive audio data, which may represent human speech such as user utterances, and generate text data corresponding to the audio data. The text data may include words corresponding to the human speech. The NLU component 154 may be configured to determine one or more intents associated with the human speech based at least in part on the text data. The ASR component 152 and the NLU component 154 are described in more detail below with respect to FIG. 7. For purposes of illustration, the ASR component 152 and the NLU component 154 may be utilized to determine one or more intents to associate and/or otherwise set up accessory devices 106.

For example, a user may speak a user utterance to the voice-enabled device 102. The microphones 114 of the voice-enabled device 102 may capture the user utterance and may generate corresponding audio data. The audio data may be sent, via the network 122, to the remote system 120. The ASR component 152 may process the audio data and generate corresponding text data. The NLU component 154 may utilize the text data to determine intent data representing an intent of the user to, in these examples, associate an accessory device 106 to a hub device 104.

The speechlets 156 may receive the intent data from the NLU component 154 and may utilize the intent data to identify, determine, and/or generate directive data corresponding to the intent data. For example, a given speechlet 156 may be called and utilized to generate directive data when the intent data indicates a "discover" and/or "pair" intent. The speechlet 156 may receive the intent data and/or words corresponding to the user utterance and may determine a directive to be sent based at least in part on the intent data and/or words. For example, a user utterance of "discover my devices" may be analyzed and a speechlet 156 for discovering and/or associating devices may be called. The speechlet 156 may generate directive data to be sent to the third-party remote system 132 indicating a directive for the third-party remote system 132 to perform one or more operations, such as, for example, causing the hub device 104 to transition to a join mode.

The third-party remote system 132 may cause the hub device 104 to transition to the join mode and may receive confirmatory data from the hub device 104 that the accessory device 106 has been successfully paired to the hub device 104. The third-party remote system 132 may generate and/or send confirmation data to the remote system 120 and/or may send an identifier of the accessory device 106 that has been paired to the hub device 104.

Based at least in part on receiving the confirmation data from the third-party remote system 132, the TTS component 158 may generate audio data to be output by the voice-enabled device 102 that confirms the accessory device 106 has been paired to the hub device 104. The speechlet(s) 156 may generate audio-output directive data directing the voice-enabled device 102 to output the audio data generated by the TTS component 158. The audio-output directive data may be sent to the voice-enabled device 102 and may cause the speakers 116 of the voice-enabled device 102 to output audio corresponding to the audio data. For example, the output audio may be "pairing complete." In examples, the audio data may also represent a request for the user to provide another user utterance to check that association of the accessory device 106 was successful. For example, the output audio may include "I found a new plug called MyPlug. Try saying 'Turn off MyPlug'." The user may then provide a second user utterance to test whether the accessory device 106 was successfully associated and set up.

The contextual-information component 160 may be configured to identify, determine, and/or generate contextual data associated with the accessory device 106, the hub device 104, the voice-enabled device 102, one or more other devices, and/or the environment associated with the devices of the system 100. For example, the contextual data may include device-location data indicating a location of the accessory device 106 within an environment. Additionally, or alternatively, the contextual data may include device-association data that indicates an identifier of another device within the environment. Additionally, or alternatively, the contextual data may include device-type data that may indicate a device type of the accessory device 106. For example, the accessory device 106 may have a device type of "plug," "light," "lock," etc.

The device-naming component 164 may be configured to identify, determine, and/or generate one or more naming indicators for the accessory devices 106. For example, the device-naming component 164 may utilize the contextual data identified, determined, and/or generated by the contextual-information component 160 to identify, determine, and/or generate the one or more naming indicators. For example, the device-location data may be utilized to identify the accessory device 106 as, for example, "kitchen light" and/or "front door lock." Additionally, with respect to the device-association data, if the accessory device 106 is located within the same room as other devices, the naming indicators of the other devices may be utilized to inform identification of the accessory-device name. By way of example, if the other devices within the environment include naming indicators such as "microwave," "refrigerator," and "coffee maker," the accessory device 106 is likely located in a kitchen and can be named accordingly, such as "kitchen light." As to the device-type data, this information may be utilized in identifying the naming indicator for the device. In addition to, or instead of, utilizing contextual data to name the accessory device 106, additional information may be requested from the user, such as via audio output by the voice-enabled device 102, and that additional information may be utilized to name the accessory device 106. The device-naming component 164 may also provide de-duping functionality such that, in examples, if the third-party remote system 132 provides a device name that is already in use, the device-naming component 164 may recognize the duplicative indicator and may provide an alternative naming indicator based at least in part on the information described herein.

The hub-arbitration component 162 may be configured to identify and/or determine which of multiple hub devices 104 within and/or associated with an environment is to be paired with an accessory device 106. For example, the environment in which the voice-enabled device 102 is situated may include accessory devices 106 that operate in connection with a first hub device 104 and accessory devices 106 that operate in connection with a second hub device 104. By way of example, the user may have smart locks that operate in connection with a first hub device 104 and smart plugs that operate in connection with a different hub device 104. In these examples, the remote system 120 may perform hub arbitration processes to determine which hub device 104 to associate with the new accessory device 106. For example, when the user provides the user utterance to set up the accessory device 106, the user utterance may include an indication of which hub device 104 to use, such as "discover my smart plug," "discover new devices in kitchen," "discover [brand name device]," "discover new devices for Hub 1," etc. The user utterance may be analyzed, via automatic speech recognition and natural language understanding, for example, to identify portions of the user utterance that indicate which hub device 104 to associate the accessory device 106 to. For example, a user utterance including an indication of the device type of the accessory device 106, such as "plug" and/or "lock," may indicate that the accessory device 106 has a device type that is associated with one hub device 104 but not other hub devices 104. Additionally, or alternatively, the user utterance may include an indication of the physical location of the accessory device 106, which may be utilized to select a hub device 104 that is closest to the physical location and/or a hub device 104 that is assigned to and/or is associated with the physical location. Additionally, or alternatively, the user utterance may include the brand name and/or developer name associated with the accessory device 106. The hub device 104 with the same or similar brand name and/or developer name may be selected to be paired to the accessory device 106. Additionally, or alternatively, the user utterance may include an indication of the hub device 104 the user desires to associate the accessory device 106 to. For example, the user utterance may include a name indicator for the hub device 104.

In other examples, such as when the user utterance does not provide an indication of which hub device 104 to associate the accessory device 106 to, audio may be output by the voice-enabled device 102 that requests additional information from the user to determine which hub device 104 to utilize. For example, the audio may instruct the user to provide a naming indicator for the desired hub device 104 and/or to provide a naming indicator for the accessory device 106. This information may be utilized to select a hub device 104.

As used herein, a processor, such as processor(s) 108, 124, 134, and/or 144, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 108, 124, 134, and/or 144 may include a graphics processing unit (GPU), a microprocessor, a digital signal processor and/or other processing units and/or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 108, 124, 134, and/or 144 may possess its own local memory, which also may store program components, program data, and/or one or more operating systems.

The memory 112, 128, 138, and/or 148 may include volatile and nonvolatile memory, removable and non-removable media implemented in any method and/or technology for storage of information, such as computer-readable instructions, data structures, program component, and/or other data. Such memory 112, 128, 138, and/or 148 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 112, 128, 138, and/or 148 may be implemented as computer-readable storage media ("CRSM"), which may be any available physical media accessible by the processor(s) 108, 124, 134, and/or 144 to execute instructions stored on the memory 112, 128, 138, and/or 148. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 112, 128, 138, and/or 148, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

The network interface(s) 110, 126, 136, and/or 146 may enable communications between the components and/or devices shown in system 100 and/or with one or more other remote systems, as well as other networked devices. Such network interface(s) 110, 126, 136, and/or 146 may include one or more network interface controllers (NICs) or other types of transceiver devices to send and receive communications over the network 122.

For instance, each of the network interface(s) 110, 126, 136, and/or 146 may include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (WiFi), or any other PAN communication protocol. Furthermore, each of the network interface(s) 110, 126, 136, and/or 146 may include a wide area network (WAN) component to enable communication over a wide area network.

In some instances, the remote system 120 may be local to an environment associated the voice-enabled device 102. For instance, the remote system 120 may be located within the voice-enabled device 102. In some instances, some or all of the functionality of the remote system 120 may be performed by the voice-enabled device 102. As described herein, a natural language system may include one or more devices, which may be voice-enabled device 102 and/or the remote system 120 and/or components thereof. As such, a natural language system may include some or all of the components described herein with respect to the voice-enabled device 102 and/or the remote system 120 as well as, in examples, additional components.

Figure 2:
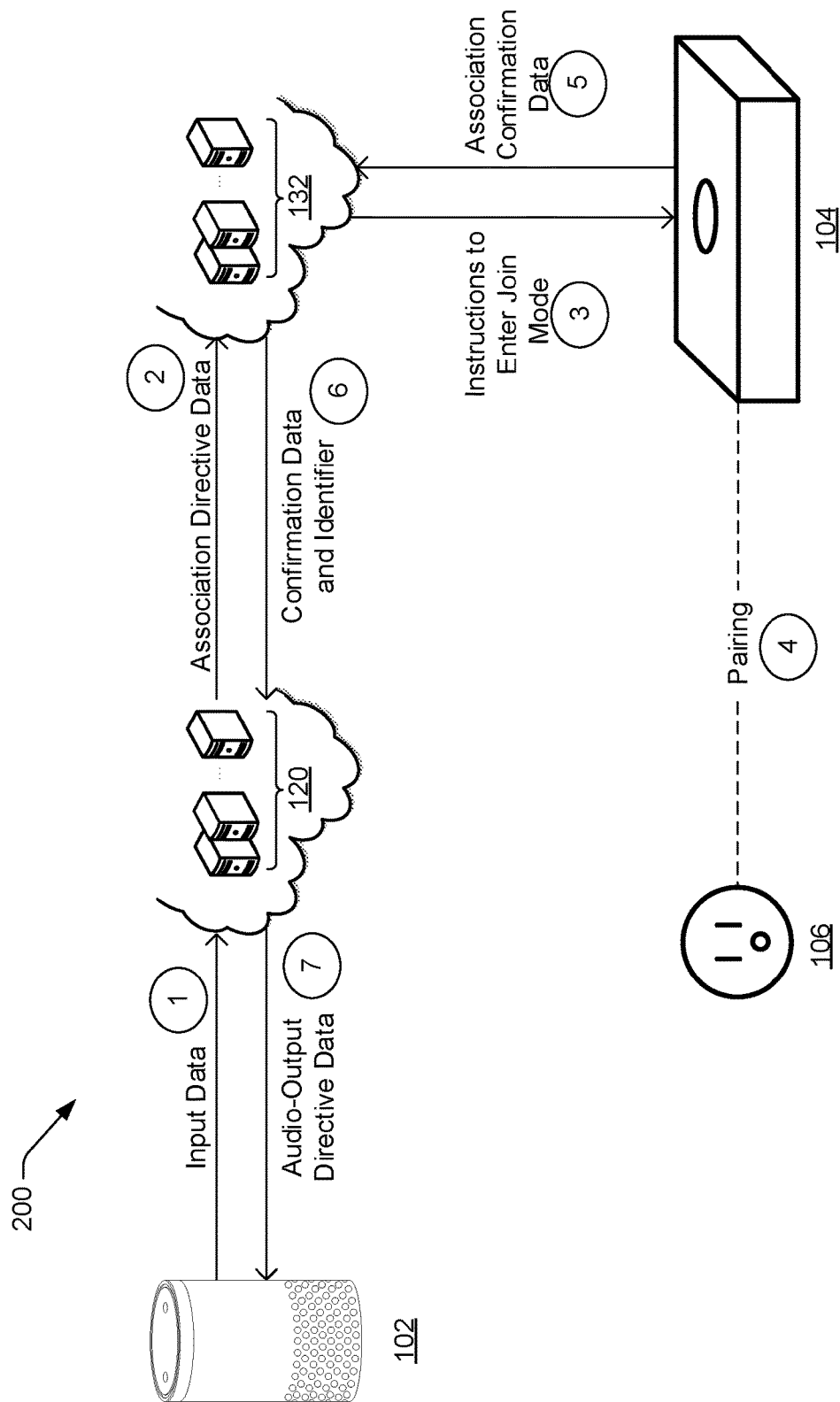
FIG. 2 illustrates a schematic diagram of an example environment for device control by a natural language processing system showing flow of data between devices in the environment.

FIG. 2 illustrates a schematic diagram of an example environment 200 for device control by a natural language processing system showing flow of data between devices in the environment. The environment 200 may include a voice-enabled device 102, a remote system 120 associated with the voice-enabled device 102, a third-party remote system 132, a hub device 104, and an accessory device 106. The voice-enabled device 102, the hub device 104, and the accessory device 106 may be situated within proximity to each other, such as within the same room and/or building. The remote system 120 and/or the third-party remote system 132 may situated away from the voice-enabled device 102, the hub device 104, and/or the accessory device 106. The components of the example environment 200 may be utilized to associate the accessory device 106 with the hub device 104, such as via pairing.

For example, the voice-enabled device 102 may identify, determine, generate, and/or receive, at step 1, input data indicating a request to associate and/or otherwise setup the accessory device 106 with the hub device 104 and/or to voice enable the accessory device 106 for use with the voice-enabled device 102. The input data may comprise audio data. For example, the microphones of the voice-enabled device 102 may capture audio representing a user utterance, such as "discover my devices." Audio data corresponding to the audio may be generated. Additionally, or alternatively, the input data may comprise input into an application associated with the voice-enabled device 102, such as via a mobile device like a mobile phone.

The input data may be sent to the remote system 120 and may be analyzed by components of the remote system 120. For example, when the input data is audio data, automatic speech recognition techniques may be utilized to generate text data from the audio data, and natural language understanding techniques may be utilized to generate intent data corresponding to the text data. The use of automatic speech recognition and natural language understanding is described in more detail below with respect to FIG. 7. In the example of FIG. 2, the intent data may indicate an intent to associate an accessory device 106 with the hub device 104. The remote system 120, such as via one or more speechlets of the remote system 120, may generate association directive data representing a directive to associate the accessory device 106 with the hub device 104.

The association directive data, at step 2, may be sent to the third-party remote system 132, which is associated with the hub device 104. The third-party remote system 132 may, at step 3 and based at least in part on receiving the association directive data, identify, determine, generate, and/or send instructions and/or data to the hub device 104 to enter into a join mode. It should be understood that while "modes" of operation of the hub device 104 are described herein, they are used for illustration only and not by way of limitation. In other examples, the instructions and/or data from the third-party remote system 132 may cause the hub device 104 to begin a pairing process, but need not specifically transition the mode of the hub device 104.

The hub device 104 may then pair, at step 4, to the accessory device 106. For example, the user may plug the accessory device 106 into a power source and/or otherwise install the accessory device 106, which may cause the accessory device 106 to enter a join mode. In other examples, tactile input to the accessory device 106, such as the actuation of a button on the accessory device 106, may cause the accessory device 106 to transition to the join mode. Once pairing is complete, the accessory device 106 may be configured to send data to and/or receive data from the hub device 104. The hub device 104 may then send, at step 5, association confirmation data to the third-party remote system 132 to confirm that association is complete. The association confirmation data may include a device identifier for the accessory device 106, such as a MAC address and/or other unique identifier.

The third-party remote system 132 may then, at step 6, identify, determine, and/or generate confirmation data indicating that association of the accessory device 106 with the hub device 104 is complete. Additionally, in examples, the third-party remote system 132 may identify, determine, and/or generate a naming indicator for the accessory device 106. For example, the device identifier of the accessory device 106 may be utilized to determine a naming indicator for the accessory device, such as "Smart Plug," "Light 1," etc. The confirmation data and/or the device identifier and/or naming indicator may be sent from the third-party remote system 132 to the remote system 120.

In examples where the third-party remote system 132 does not provide a naming indicator, the remote system 120 may identify, determine, and/or generate the naming indicator. In these examples, it may be desirable to identify and/or determine a "friendly" name for the accessory device 106 that may be utilized by the remote system 120 and/or the user to operate the accessory device 106. Examples of friendly names may include "hallway light," "front door lock," etc. To identify and/or determine a friendly name for the accessory device 106, the remote system 120 may utilize contextual information associated with the accessory device 106. For example, the contextual information may include device-location data indicating a location of the accessory device 106 within an environment. The device-location data may be utilized to identify the accessory device 106 as, for example, "kitchen light" and/or "front door lock."

Additionally, or alternatively, the contextual data may include device-association data that indicates an identifier of another device within the environment. For example, if the accessory device 106 is located within the same room as other devices, the naming indicators of the other devices may be utilized to inform identification of the accessory device 106 name. By way of example, if the other devices within the environment include naming indicators such as "microwave," "refrigerator," and "coffee maker," the accessory device 106 is likely located in a kitchen and can be named accordingly, such as "kitchen light." Additionally, or alternatively, the contextual information may include device type data that may indicate a device type of the accessory device 106. For example, the accessory device 106 may be a "plug," "light," "lock," etc. This information may be utilized in identifying the naming indicator for the accessory device 106. In addition to, or instead of, utilizing contextual information to name the accessory device 106, additional information may be requested from the user, such as via audio output by the voice-enabled device 102, and that additional information may be utilized to name the accessory device 106.

The remote system 120 may then generate audio data corresponding to audio to be output by the voice-enabled device 102 to confirm that the association of the accessory device 106 to the hub device 104 is complete. Additionally, in examples, the remote system 120, such as via one or more speechlets, may generate, at step 7, audio-output directive data and may send the audio-output directive data and the audio data to the voice-enabled device 102. The audio-output directive data may cause the speakers of the voice-enabled device 102 to output audio corresponding to the audio data. For example, the output audio may be "pairing complete" and/or "joining complete." In examples, the audio data may also represent a request for the user to provide another user utterance to check that association of the accessory device 106 to the hub device 104 was successful. For example, the output audio may include "I found a new plug called MyPlug. Try saying 'Turn off MyPlug'." The user may then provide a second user utterance to test whether the accessory device 106 was successfully associated and setup.

While the accessory device 106 has been described in terms of a physical device, the accessory device 106 may additionally, or alternatively, include a virtual accessory device 106. A virtual accessory device 106 may be represented by a device indicator and may correspond to functionality such as a "scene" or "grouping."

Figure 3:
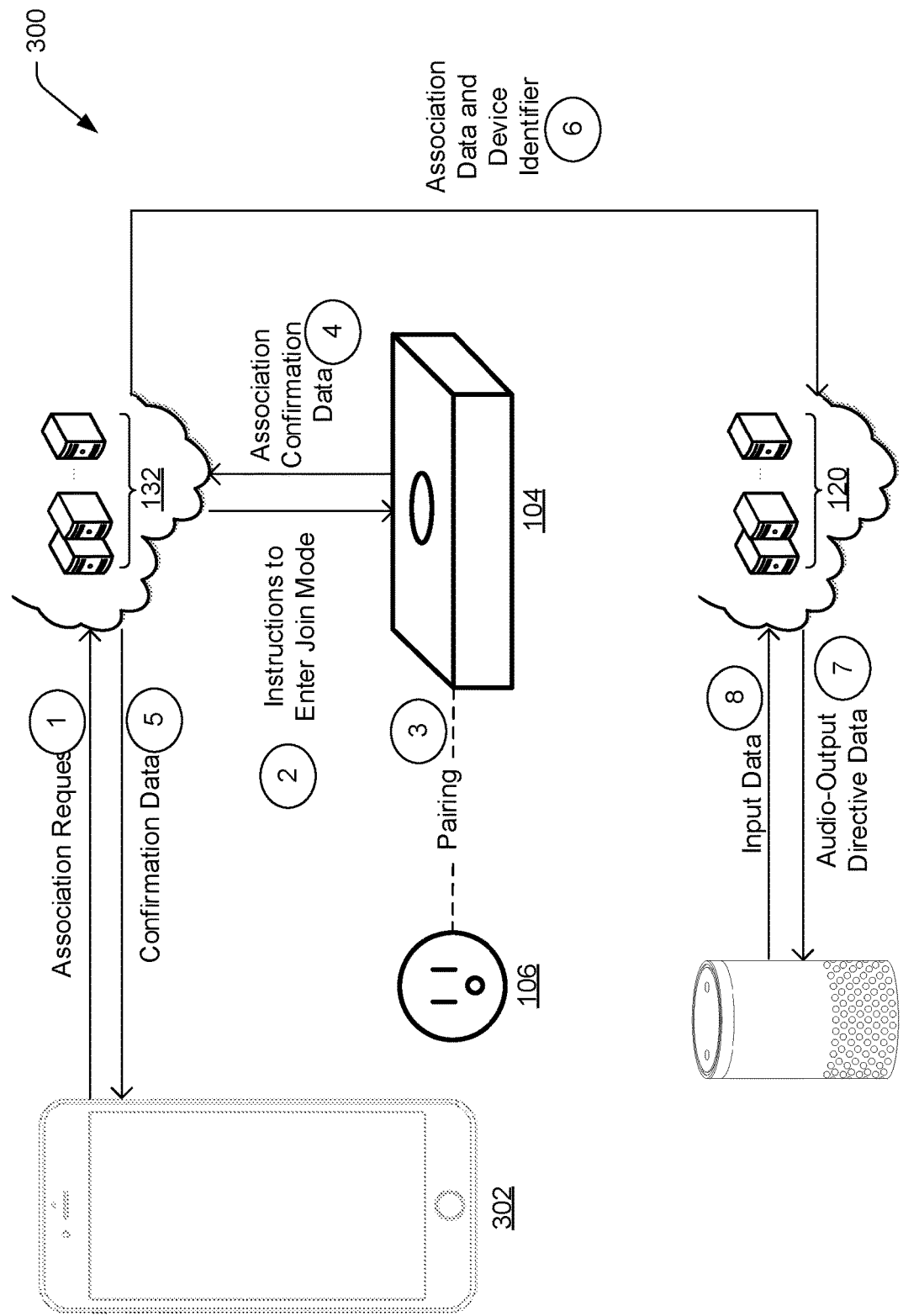
FIG. 3 illustrates a schematic diagram of another example environment for device control by a natural language processing system showing flow of data between devices in the environment.

FIG. 3 illustrates a schematic diagram of another example environment 300 for device control by a natural language processing system showing flow of data between devices in the environment 300. The environment 300 may include a voice-enabled device 102, a remote system 120 associated with the voice-enabled device 102, a third-party remote system 132, a hub device 104, and an accessory device 106. The environment 300 may also include a personal device 302, which may be a mobile phone as shown in FIG. 3. The personal device 302 may have stored thereon and/or may access an application associated with the hub device 104, the accessory device 106, and/or the third-party remote system 132. The voice-enabled device 102, the hub device 104, and the accessory device 106 may be situated within proximity to each other, such as within the same room and/or building. The remote system 120 and/or the third-party remote system 132 may be situated away from the voice-enabled device 102, the hub device 104, and/or the accessory device 106. The components of the example environment 300 may be utilized to associate the accessory device 106 with the hub device 104.

For example, unlike in FIG. 2 where the user initiated association of the accessory device 106 via user input to the voice-enabled device 102, the user may desire to initiate device association via the third-party application associated with the accessory device 106, hub device 104, and/or third-party remote system 132. In other examples, upon receiving the accessory device 106, the packaging and/or instructions associated with the accessory device 106 may instruct the user to download and/or otherwise access the third-party application for device association. The user may desire to follow these instructions, and in doing so, may initiate device association via the personal device 302. An association request, at step 1, may be sent from the personal device 302 to the third-party remote system 132. Based at least in part on receiving the association request, the third-party remote system 132 may, at step 2, identify, determine, generate, and/or send instructions to the hub device 104 to transition to a join mode. It should be understood that while "modes" of operation of the hub device 104 are described herein, they are used for illustration only and not by way of limitation. In other examples, the instructions and/or data from the third-party remote system 132 may cause the hub device 104 to begin a pairing process, but need not specifically transition the mode of the hub device 104.

The hub device 104 may then pair, at step 3, to the accessory device 106. For example, the user may plug the accessory device 106 into a power source and/or otherwise install the accessory device 106, which may cause the accessory device 106 to enter a join mode. In other examples, tactile input to the accessory device 106, such as the actuation of a button on the accessory device 106, may cause the accessory device 106 to enter into the join mode. Once pairing is complete, the accessory device 106 may be configured to send data to and/or receive data from the hub device 104. The hub device 104 may then send, at step 4, association confirmation data to the third-party remote system 132 to confirm that association of the accessory device 106 with the hub device 104 is complete. The association confirmation data may include a device identifier for the accessory device 106, such as a MAC address and/or other unique identifier.

The third-party remote system 132 may then, at step 5, identify, determine, and/or generate confirmation data indicating that association of the accessory device 106 with the hub device 104 is complete. Additionally, in examples, the third-party remote system 132 may identify, determine, and/or generate a naming indicator for the accessory device 106. For example, the device identifier of the accessory device 106 may be utilized to determine a naming indicator for the accessory device, such as "Smart Plug," "Light 1," etc. The confirmation data and/or the device identifier and/or naming indicator may be sent from the third-party remote system 132 to the personal device 302.

In addition to sending confirmation data to the personal device 302, the third-party remote system 132 may also identify, determine, generate, and/or send association data and the device identifier to the remote system 120 associated with the voice-enabled device 102. The sending of this data may be performed proactively, such as without being requested specifically by the remote system 120. For example, the third-party remote system 132 may store data indicating that the hub device 104 is associated with the voice-enabled device 102. Based at least in part on this association, the third-party remote system 132 may be configured to send, at step 6, the association data and/or the device identifier to the remote system 120 when association of a new accessory device 106 is initiated, in process, and/or completed.

The remote system 120, having received the association data and/or the device identifier, may store such information and may voice enable the accessory device 106 for operation via the voice-enabled device 102. The remote system 120 may then generate audio data corresponding to audio to be output by the voice-enabled device 102 to confirm that the association is complete. Additionally, in examples, the remote system 120, such as via one or more speechlets, may, at step 7, generate audio-output directive data and may send the audio-output directive data and the audio data to the voice-enabled device 102. The audio-output directive data may cause the speakers of the voice-enabled device 102 to output audio corresponding to the audio data. For example, the output audio may be "pairing complete" and/or "joining complete." In examples, the audio data may also represent a request for the user to provide another user utterance to check that association of the accessory device 106 was successful. For example, the output audio may include "I found a new plug called MyPlug. Try saying 'Turn off MyPlug'." The user may then provide a second user utterance to test whether the accessory device 106 was successfully associated and setup.

In other examples, the output audio may request the user to provide confirmation that he/she would like to voice enable the accessory device 106. Upon receiving a confirmatory response from the user, the remote system 120 may perform the voice enablement operations described above. Thereafter, the user may provide input to the voice-enabled device 102, such as via a user utterance, and the voice-enabled device 102 may generate input data, at step 8, to be sent to the remote system 120. The remote system 120, such as via ASR and/or NLU techniques, may determine an intent associated with the user utterance, which here may be an intent to perform an operation via the accessory device 106. Directive data may be sent from the remote system 120 to one or more of the accessory device 106, the hub device 104, the third-party remote system 132, and/or the voice-enabled device 102 to perform the desired operation.

Figure 4:
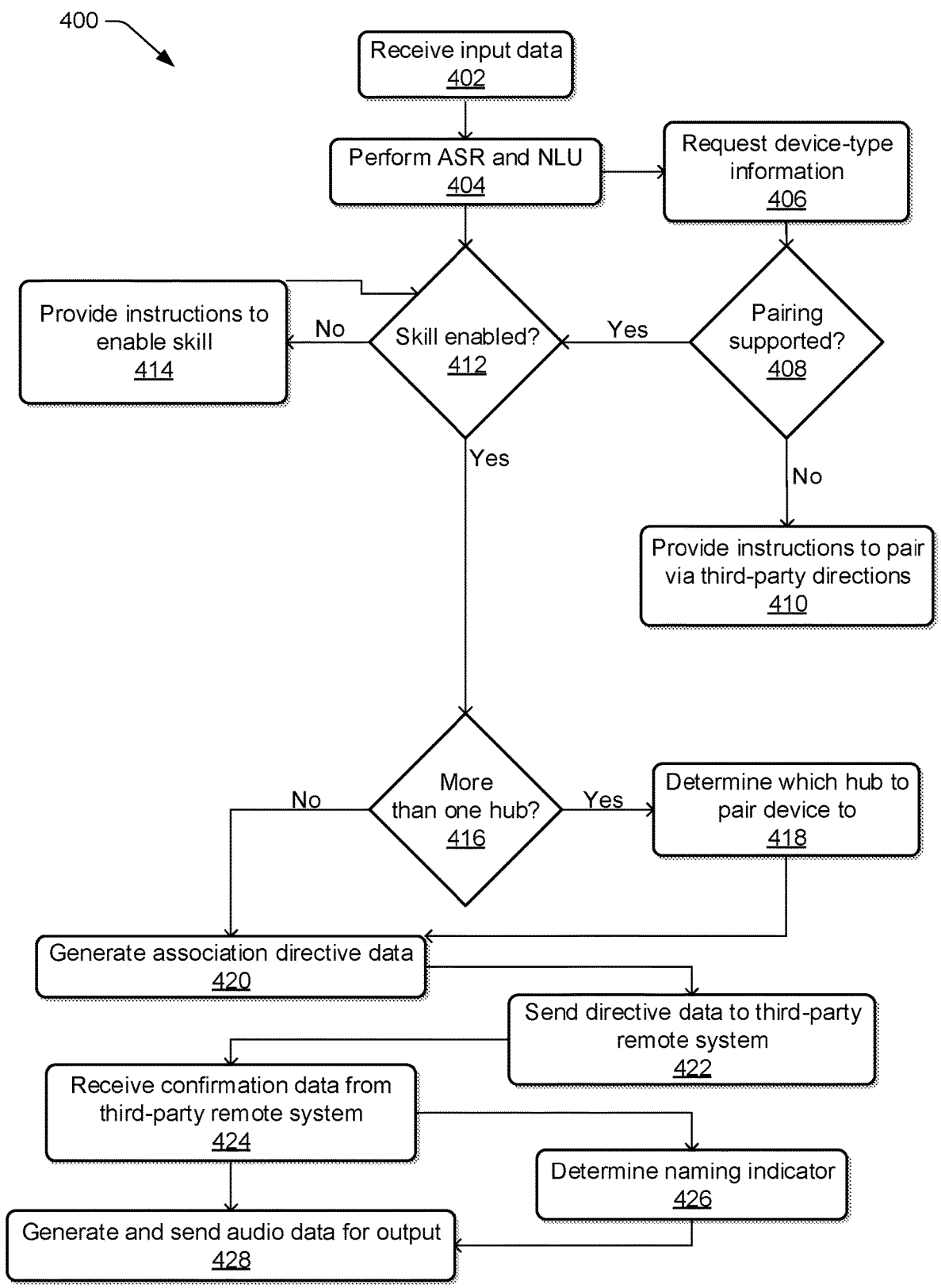
FIG. 4 illustrates a flow diagram of an example process for device control by a natural language processing system.
Figure 5:
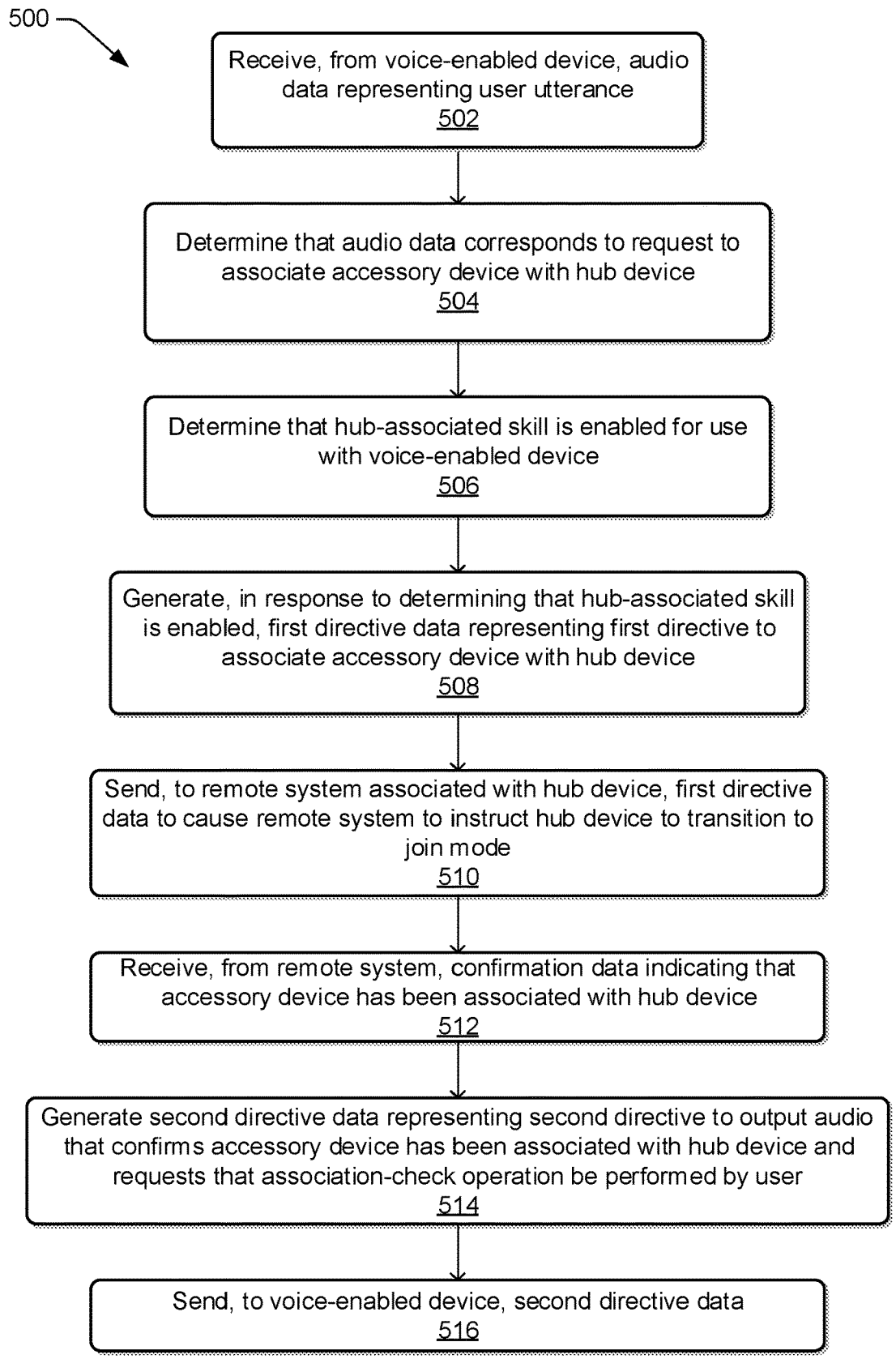
FIG. 5 illustrates a flow diagram of another example process for device control by a natural language processing system.
Figure 6:
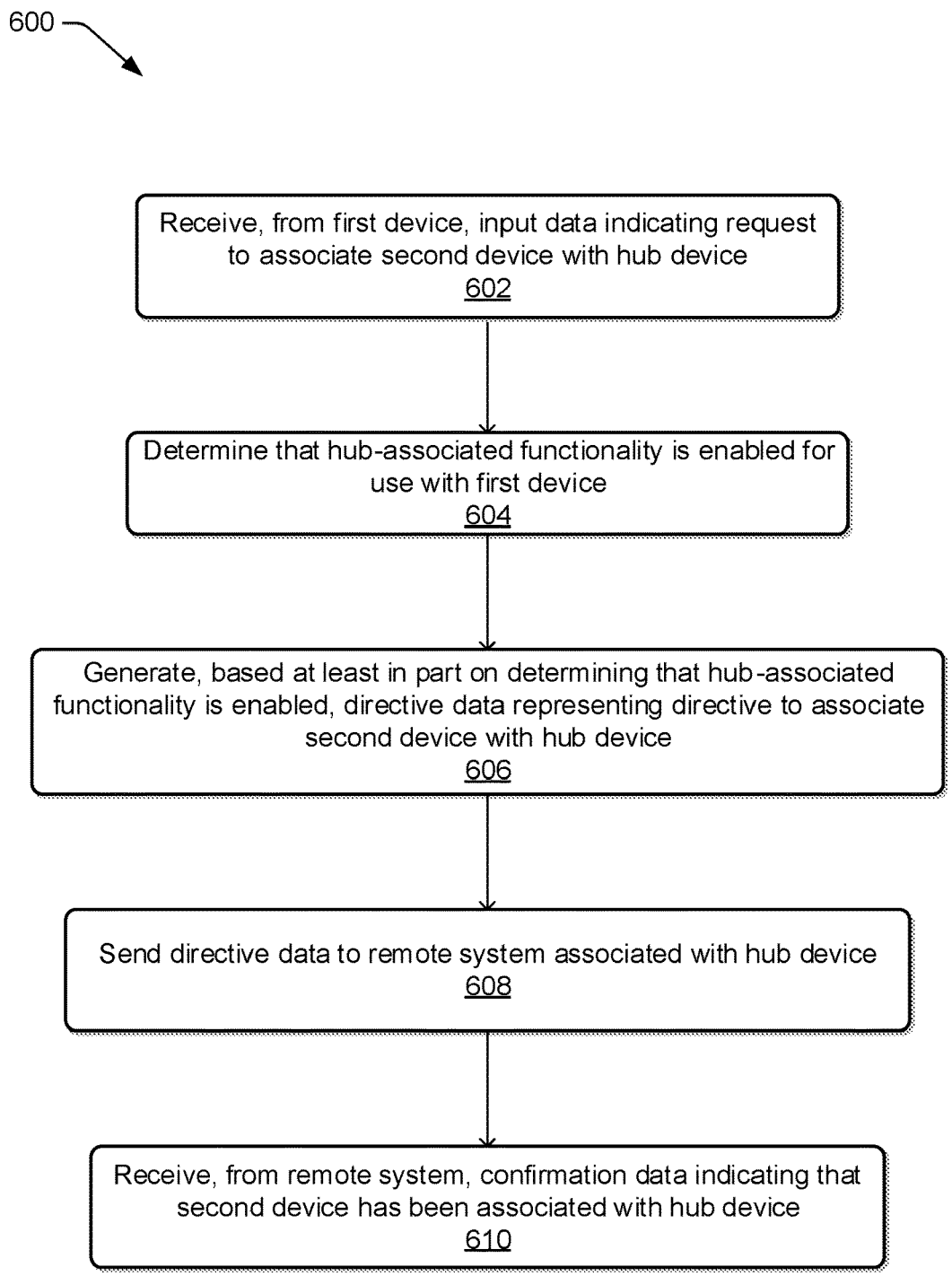
FIG. 6 illustrates a flow diagram of another example process for device control by a natural language processing system.

FIGS. 4-6 illustrate various processes for smart-home device pairing. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions and/or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-3, 7, and 8, although the processes may be implemented in a wide variety of other environments, architectures and systems.

FIG. 4 illustrates a flow diagram of an example process for device control by a natural language processing system. The order in which the operations or steps are described is not intended to be construed as a limitation, and any number of the described operations may be combined in any order and/or in parallel to implement process 400.

At block 402, the process 400 may include receiving input data, such as from a natural language system, which may include a voice-enabled device. For example, the voice-enabled device may identify, determine, generate, and/or receive input data indicating a request to associate and/or otherwise set up an accessory device with a hub device and/or to voice enable the accessory device for use with the voice-enabled device. The input data may comprise audio data. For example, the microphones of the voice-enabled device may capture audio representing a user utterance, such as "discover my devices." Audio data corresponding to the audio may be generated. Additionally, or alternatively, the input data may comprise input into an application associated with the voice-enabled device, such as via a mobile device like a mobile phone. The input data may be received by a remote system associated with the voice-enabled device and may be analyzed by components of the remote system.

For example, at block 404, the process 400 may include performing automatic speech recognition and natural language understanding techniques. Automatic speech recognition techniques may be utilized to generate text data from the input data, and natural language understanding techniques may be utilized to generate intent data corresponding to the text data. The use of automatic speech recognition and natural language understanding is described in more detail below with respect to FIG. 7. In the example of FIG. 4, the intent data may indicate an intent to associate an accessory device with a hub device and/or to voice enable the accessory device.

At block 406, the process 400 may optionally request device-type information. For example, the voice-enabled device may be caused to output audio representing a request for device-type information. The request may be, for example, "what type of device are you trying to set up" and/or "is your device a plug, a light, a lock, and/or a different device?" The user may provide additional input, such as a user utterance that includes a response to the request. Corresponding audio data may be generated and sent to the remote system for speech processing.

At block 408, the process 400 may include determining whether pairing utilizing the systems and methods described herein is supported for the type of device that is being set up. For example, certain device types may be supported for pairing while other device types may not. Devices such as plugs, lights, switches, speakers, televisions, clocks, and other similar devices may be supported. Other devices, such as security systems, locks, and similar devices may not be supported. A database of devices and/or device types may be maintained to provide an indication of which devices and device types are supported.

At block 410, if the device type is not supported, the process 400 may continue to block 410 where instructions may be provided to associate the accessory device via third-party directions. For example, audio may be output by speakers of the voice-enabled device and the audio may indicate that the device to be paired is not supported. The user may be instructed to refer to pairing instruction materials provided along with the accessory device and/or available by the seller and/or developer of the accessory device.

Returning to block 408, if the device type is supported, the process 400 may continue to block 412 where a determination may be made as to whether a skill and/or hub-associated functionality is enabled for use by the voice-enabled device. For example, a voice-enabled device may be situated within an environment along with a hub device. The hub device may be set up to communicate with the voice-enabled device. For example, a skill associated with the hub device may be downloaded and/or otherwise accessible to a personal device associated with the voice-enabled device. An example of this scenario may be as follows. A user may have purchased and set up a voice-enabled device in his/her home. The user may then purchase an accessory device that requires a related hub device and/or that may be utilized along with a hub device. The user may have set up the hub device to interact with the voice-enabled device.

If the third-party application is not enabled, then at block 414, the process 400 may include providing instructions to enable the third-party application. The instructions may be presented via output of audio from the speakers of the voice-enabled device. For example, the instructions may state "please enable the skill for the device you'd like to setup" and/or "please enable the skill for your hub device." Enabling the skill may involve utilizing the application associated with the voice-enabled device to select the skill and downloading data and/or creating an association between the instance of the application, the mobile phone, and/or the user profile associated with the voice-enabled device and the third-party application.

At block 416, the process 400 may include determining whether there is more than one hub device associated with the voice-enabled device. For example, a voice-enabled device may be situated within an environment along with multiple dub devices. An example of this scenario may be that the environment includes multiple accessory devices that require or otherwise utilize multiple hub devices. For example, the environment may include one or more light bulbs made by a first developer and that are associated with a first hub device. Additionally, the environment may include one or more locks made by a second developer and that are associated with a second hub device.

If more than one hub device is determined to be associated with the voice-enabled device, at block 418, the process 400 may include determining which hub device to associate with the accessory device. For example, when the user provides the user utterance to setup the accessory device, the user utterance may include an indication of which hub device to use, such as "discover my smart plug," "discover new devices in kitchen," "discover [brand name device]," "discover new devices for Hub 1," etc. The user utterance may be analyzed, via automatic speech recognition and natural language understanding, for example, to identify portions of the user utterance that indicate which hub device to associate the accessory device with. For example, a user utterance including an indication of the device type of the accessory device, such as "plug" and/or "lock," may indicate that the accessory device has a device type that is associated with one hub device but not other hub devices. Additionally, or alternatively, the user utterance may include an indication of the physical location of the accessory device, which may be utilized to select a hub device that his closest to the physical location and/or a hub device that is assigned to and/or is associated with the physical location. Additionally, or alternatively, the user utterance may include the brand name and/or developer name associated with the accessory device. The hub device with the same or similar brand name and/or developer name may be selected to be associated with the accessory device. Additionally, or alternatively, the user utterance may include an indication of the hub device the user desires to associate the accessory device with. For example, the user utterance may include a name indicator for the hub device.

In other examples, such as when the user utterance does not provide an indication of which hub device to associate with the accessory device, audio may be output by the voice-enabled device that requests additional information from the user to determine which hub device to utilize. For example, the audio may instruct the user to provide a naming indicator for the desired hub device and/or to provide a naming indicator for the accessory device. This information may be utilized to select a hub device.

Once the hub device of the multiple hub devices is selected, or in examples where, at block 416, it is determined that only one hub device is associated with the voice-enabled device, the process 400 may proceed to block 420, where association directive data may be generated. For example, the system may utilize one or more speechlets to generate association directive data representing a directive to associate the accessory device with the hub device.

At block 422, the process 400 may include sending the association directive data to the third-party remote system, which is associated with the hub device. The third-party remote system may, based at least in part on receiving the association directive data, identify, determine, generate, and/or send instructions and/or data to the hub device to transition to a join mode. It should be understood that while "modes" of operation of the hub device are described herein, they are used for illustration only and not by way of limitation. In other examples, the instructions and/or data from the third-party remote system may cause the hub device to begin a pairing process, but need not specifically transition the mode of the hub device.

The hub device may then associate with the accessory device. For example, the user may plug the accessory device into a power source and/or otherwise install the accessory device, which may cause the accessory device to enter a join mode. In other examples, tactile input to the accessory device, such as the actuation of a button on the accessory device, may cause the accessory device to transition to the join mode. Once pairing is complete, the accessory device may be configured to send data to and/or receive data from the hub device. The hub device may then send association confirmation data to the third-party remote system to confirm that pairing is complete. The association confirmation data may include a device identifier for the accessory device, such as a MAC address and/or other unique identifier.

The third-party remote system may then identify, determine, and/or generate confirmation data indicating that association of the accessory device with the hub device is complete. At block 424, the process 400 may include receiving the association confirmation data from the third-party remote system. Additionally, in examples, the third-party remote system may identify, determine, and/or generate a naming indicator for the accessory device. For example, the device identifier of the accessory device may be utilized to determine a naming indicator for the accessory device, such as "Smart Plug," "Light 1," etc. The confirmation data and/or the device identifier and/or naming indicator may be sent from the third-party remote system to the remote system.

In examples where the third-party remote system does not provide a naming indicator, at block 426, the system may identify, determine, and/or generate the naming indicator. In these examples, it may be desirable to identify and/or determine a "friendly" name for the accessory device that may be utilized by the system and/or the user to operate the accessory device. Examples of friendly names may include "hallway light," "front door lock," etc. To identify and/or determine a friendly name for the accessory device, the system may utilize contextual information associated with the accessory device. For example, the contextual information may include device-location data indicating a location of the accessory device within an environment. The device-location data may be utilized to identify the accessory device as, for example, "kitchen light" or "front door lock."

Additionally, or alternatively, the contextual data may include device-association data that indicates an identifier of another device within the environment. For example, if the accessory device is located within the same room as other devices, the naming indicators of the other devices may be utilized to inform identification of the accessory device name. By way of example, if the other devices within the environment include naming indicators such as "microwave," "refrigerator," and "coffee maker," the accessory device is likely located in a kitchen and can be named accordingly, such as "kitchen light." Additionally, or alternatively, the contextual information may include device-type data that may indicate a device type of the accessory device. For example, the accessory device may be a "plug," "light," "lock," etc. This information may be utilized in identifying the naming indicator for the accessory device. In addition to, or instead of, utilizing contextual information to name the accessory device, additional information may be requested from the user, such as via audio output by the voice-enabled device, and that additional information may be utilized to name the accessory device.

At block 428, the process 400 may include generating audio data corresponding to audio to be output by the voice-enabled device to confirm that the association of the accessory device to the hub device is complete. Additionally, in examples, the system, such as via one or more speechlets, may generate audio-output directive data and may send the audio-output directive data and the audio data to the voice-enabled device. The audio-output directive data may cause the speakers of the voice-enabled device to output audio corresponding to the audio data. For example, the output audio may be "pairing complete." In examples, the audio data may also represent a request for the user to provide another user utterance to check that association of the accessory device was successful. For example, the output audio may include "I found a new plug called MyPlug. Try saying 'Turn off MyPlug'." The user may then provide a second user utterance to test whether the accessory device was successfully associated and setup.

FIG. 5 illustrates a flow diagram of an example process for smart-home device pairing. The order in which the operations or steps are described is not intended to be construed as a limitation, and any number of the described operations may be combined in any order and/or in parallel to implement process 500.

At block 502, process 500 may include receiving, from a voice-enabled device, audio data representing a user utterance. For example, the voice-enabled device may identify, determine, generate, and/or receive audio data indicating a request to associate and/or otherwise setup an accessory device with a hub device and/or to voice enable the accessory device for use with the voice-enabled device. For example, the microphones of the voice-enabled device may capture audio representing a user utterance, such as "discover my devices." Audio data corresponding to the audio may be generated. The audio data may be sent from the voice-enabled device to the remote system.

At block 504, the process 500 may include determining that the audio data corresponds to a request to associate an accessory device with a hub device. Automatic speech recognition techniques may be utilized to generate text data from the audio data, and natural language understanding techniques may be utilized to generate intent data corresponding to the text data. The intent data may indicate an intent to associate an accessory device and/or to voice enable the accessory device.

At block 506, the process 500 may include determining that a hub-associated skill is enabled for use with the voice-enabled device. For example, a voice-enabled device may be situated within an environment along with a hub device. The hub device may be setup to communicate with the voice-enabled device. For example, a skill associated with the hub device may be downloaded and/or otherwise accessible to a personal device associated with the voice-enabled device. An example of this scenario may be as follows. A user may have purchased and setup a voice-enabled device in his/her home. The user may then purchase an accessory device that requires a related hub device and/or that may be utilized along with a hub device. The user may have setup the hub device to interact with the voice-enabled device. A "skill" may have been enabled via the voice-enabled device and/or an application associated with the voice-enabled device that allows the voice-enabled device to communicate with the hub device. If the skill is not enabled, the process 500 may include provide instructions to enable the skill. The instructions may be presented via output of audio from the speakers of the voice-enabled device. For example, the instruction may state "please enable the skill for the device you'd like to setup" and/or "please enable the skill for your hub device."

At block 508, the process 500 may include generating, in response to determining that the hub-associated skill is enabled, first directive data representing a first directive to associate the accessory device with the hub device. For example, a speechlet may be called and utilized to generate directive data when the intent data indicates a "discover" and/or "pair" intent. The speechlet may receive the intent data and/or words corresponding to the user utterance and may determine a directive to be sent based at least in part on the intent data and/or words. For example, a user utterance of "discover my devices" may be analyzed and a speechlet for discovering and/or pairing devices may be called. The speechlet may generate directive data to be sent to a third-party remote system associated with the hub device indicating a directive for the third-party remote system to perform one or more operations, such as, for example, causing the hub device to enter into a join mode.

At block 510, the process 500 may include sending, to a remote system associated with the hub device, the first directive data. Sending the first directive data may cause the remote system to instruct the hub device to transition to a join mode and/or to associate the accessory device with the hub device. For example, the third-party remote system may cause the hub device to enter into the join mode and may receive confirmation data from the hub device that the accessory device has been successfully associated with the hub device.

At block 512, the process 500 may include receiving, from the remote system, confirmation data indicating that the accessory device has been associated with the hub device. For example, the third-party remote system may generate and/or send confirmation data to the remote system and/or may send an identifier of the accessory device that has been associated with the hub device.

At block 514, the process 500 may include generating second directive data representing a second directive to output audio confirming that the accessory device has been associated with the hub device and/or requesting that an association-check operation be performed. For example, audio data may be generated corresponding to audio to be output by the voice-enabled device to confirm that the association have been established. Additionally, in examples, the system, such as via one or more speechlets, may generate audio-output directive data and may send the audio-output directive data and the audio data to the voice-enabled device.

At block 516, the process 500 may include sending, to the voice-enabled device, the second directive data. The audio-output directive data may cause the speakers of the voice-enabled device to output audio corresponding to the audio data. For example, the output audio may be "pairing complete" and/or "device joined." In examples, the audio data may also represent a request for the user to provide another user utterance to check that association of the accessory device with the hub device was successful. For example, the output audio may include "I found a new plug called MyPlug. Try saying 'Turn off MyPlug'." The user may then provide a second user utterance to test whether the accessory device was successfully associated and setup.

The process 500 may additionally, or alternatively, include identifying a second hub device associated with the voice-enabled device and sending, to the voice-enabled device, third directive data representing a third directive to output second audio representing a request to select between the first hub device and the second hub device. The process 500 may also include receiving, from the voice-enabled device, second audio data representing a second user utterance and determining that the second user utterance corresponds to a response indicating the accessory device is to be associated with the first hub device. In these examples, generating the first directive data may be based at least in part on determining that the second user utterance corresponds to the response indicating the accessory device is to be associated with the first hub device.

Additionally, or alternatively, when the user provides the user utterance to setup the accessory device, the user utterance may include an indication of which hub device to use, such as "discover my smart plug," "discover new devices in kitchen," "discover [brand name device]," "discover new devices for Hub 1," etc. The user utterance may be analyzed, via automatic speech recognition and natural language understanding, for example, to identify portions of the user utterance that indicate which hub device to associate with the accessory device. For example, a user utterance including an indication of the device type of the accessory device, such as "plug" and/or "lock," may indicate that the accessory device has a device type that is associated with one hub device but not other hub devices. Additionally, or alternatively, the user utterance may include an indication of the physical location of the accessory device, which may be utilized to select a hub device that his closest to the physical location and/or a hub device that is assigned to and/or is associated with the physical location. Additionally, or alternatively, the user utterance may include the brand name and/or developer name associated with the accessory device. The hub device with the same or similar brand name and/or developer name may be selected to be associated with the accessory device. Additionally, or alternatively, the user utterance may include an indication of the hub device the user desires to associate the accessory device with. For example, the user utterance may include a name indicator for the hub device.

The process 500 may additionally, or alternatively, include receiving, from the third-party remote system, accessory-device identification data indicating a device identifier of the accessory device. The process 500 may also include receiving contextual data associated with the accessory device. For example, the contextual information may include device location data indicating a location of the accessory device within an environment. The device location data may be utilized to identify the accessory device as, for example, "kitchen light" and/or "front door lock." The contextual data may include device association data that indicates an identifier of another device within the environment. For example, if the accessory device is located within the same room as other devices, the naming indicators of the other devices may be utilized to inform identification of the accessory device name. By way of example, if the other devices within the environment include naming indicators such as "microwave," "refrigerator," and "coffee maker," the accessory device is likely located in a kitchen and can be named accordingly, such as "kitchen light." Additionally, or alternatively, the contextual information may include device type data that may indicate a device type of the accessory device. For example, the accessory device may be a "plug," "light," "lock," etc. This information may be utilized in identifying the naming indicator for the accessory device. In addition to, or instead of, utilizing contextual information to name the accessory device, additional information may be requested from the user, such as via audio output by the voice-enabled device, and that additional information may be utilized to name the accessory device. The process 500 may include determining a naming indictor for the accessory device based at least in part on the contextual data and associating the device identifier of the accessory device with the naming indicator.

The process 500 may additionally, or alternatively, include generating third directive data representing a third directive to output, via the voice-enabled device, second audio requesting identification information associated with the accessory device. This operation may be based at least in part on be in response to determining that the first audio data corresponds to the request to associate the accessory device with the hub device. The process 500 may also include receiving, from the voice-enabled device, second audio data representing a second user utterance and determining that the second audio data represents, at least in part, the identification information. The process 500 may also include identifying, from the identification information, a device type of the accessory device and causing output, via the voice-enabled device and based at least in part on the device type, of audio representing an instruction to put the accessory device into the join mode.

FIG. 6 illustrates a flow diagram of an example process for smart-home device pairing. The order in which the operations or steps are described is not intended to be construed as a limitation, and any number of the described operations may be combined in any order and/or in parallel to implement process 600.

At block 602, process 600 may include receiving, from a first device, input data indicating a request to associate a second device with a hub device. For example, the first device may be a voice-enabled device, while the second device may be an accessory device. The input data may comprise audio data. For example, the microphones of the voice-enabled device may capture audio representing a user utterance, such as "discover my devices." Audio data corresponding to the audio may be generated. Additionally, or alternatively, the input data may comprise input into an application associated with the voice-enabled device, such as via a mobile device like a mobile phone. The input data may be received by a remote system associated with the voice-enabled device and may be analyzed by components of the remote system. Automatic speech recognition techniques may be utilized to generate text data from the audio data, and natural language understanding techniques may be utilized to generate intent data corresponding to the text data. The intent data may indicate an intent to add a device to a network. For example, adding a device to a network may include associating an accessory device with a hub device and/or to voice enable the accessory device by the voice-enabled device.

At block 604, the process 600 may include determining that hub-associated functionality is enabled for use with the first device. For example, a voice-enabled device may be situated within an environment along with a hub device. The hub device may be setup to communicate with the voice-enabled device. For example, hub-associated functionality, which may be described as a skill, may be downloaded and/or otherwise accessible to a personal device associated with the voice-enabled device. An example of this scenario may be as follows. A user may have purchased and setup a voice-enabled device in his/her home. The user may then purchase an accessory device that requires a related hub device and/or that may be utilized along with a hub device. The user may have set up the hub device to interact with the voice-enabled device. A "skill" may have been enabled via the voice-enabled device and/or an application associated with the voice-enabled device that allows the voice-enabled device to communicate with the hub device. If the hub-associated functionality is not enabled, the process 600 may include provide instructions to enable the functionality. The instructions may be presented via output of audio from the speakers of the voice-enabled device. For example, the instruction may state "please enable the skill for the device you'd like to setup" and/or "please enable the skill for your hub device."

At block 606, the process 600 may include generating, based at least in part on determining that the hub-associated functionality is enabled, directive data representing a directive to associate the second device with the hub device. For example, a speechlet may be called and utilized to generate directive data when the intent data indicates a "discover" and/or "pair" intent. The speechlet may receive the intent data and/or words corresponding to the user utterance and may determine a directive to be sent based at least in part on the intent data and/or words. For example, a user utterance of "discover my devices" may be analyzed and a speechlet for discovering and/or pairing devices may be called. The speechlet may generate directive data to be sent to a third-party remote system associated with the hub device indicating a directive for the third-party remote system to perform one or more operations, such as, for example, causing the hub device to enter into a join mode.

At block 608, the process 600 may include sending the directive data to a remote system associated with the hub device. Sending the directive data may cause the remote system to cause the hub device to transition to a join mode and associate the accessory device with the hub device. For example, the third-party remote system may cause the hub device to enter into the join mode and may receive confirmation data from the hub device that the accessory device has been successfully associated with the hub device.

At block 610, the process 600 may include receiving, from the remote system, confirmation data indicating that the second device has been associated with the hub device. For example, the third-party remote system may generate and/or send confirmation data to the remote system and/or may send an identifier of the accessory device that has been associated with the hub device.

The process 600 may additionally, or alternatively, include identifying a second hub device associated with the voice-enabled device and sending, to the voice-enabled device, directive data representing a directive to output second audio representing a request to select between the first hub device and the second hub device. The process 600 may also include receiving, from the voice-enabled device, second input data representing a second user utterance and determining that the second user utterance corresponds to a response indicating the accessory device is to be associate with the first hub device. In these examples, generating the directive data may be based at least in part on determining that the second user utterance corresponds to the response indicating the accessory device is to be associated with the first hub device.

Additionally, or alternatively, when the user provides the user utterance to setup the accessory device, the user utterance may include an indication of which hub device to use, such as "discover my smart plug," "discover new devices in kitchen," "discover [brand name device]," "discover new devices for Hub 1," etc. The user utterance may be analyzed, via automatic speech recognition and natural language understanding, for example, to identify portions of the user utterance that indicate which hub device to associate the accessory device with. For example, a user utterance including an indication of the device type of the accessory device, such as "plug" and/or "lock," may indicate that the accessory device has a device type that is associated with one hub device but not other hub devices. Additionally, or alternatively, the user utterance may include an indication of the physical location of the accessory device, which may be utilized to select a hub device that his closest to the physical location and/or a hub device that is assigned to and/or is associated with the physical location. Additionally, or alternatively, the user utterance may include the brand name and/or developer name associated with the accessory device. The hub device with the same or similar brand name and/or developer name may be selected to be associated with the accessory device. Additionally, or alternatively, the user utterance may include an indication of the hub device the user desires to associate the accessory device with. For example, the user utterance may include a name indicator for the hub device.

The process 600 may additionally, or alternatively, include receiving, from the third-party remote system, a naming indicator of the accessory device. The process 600 may also include generating directive data representing a directive to output audio including the naming indicator and providing an instruction to perform an accosiation-check operation with the accessory device. The directive data may be sent to the voice-enabled device for output, such as via speakers of the voice-enabled device.

The process 600 may additionally, or alternatively, include receiving, from the third-party remote system, device identification data indicating a device identifier of the accessory device. The process 600 may also include receiving contextual data associated with the accessory device. For example, the contextual information may include device location data indicating a location of the accessory device within an environment. The device location data may be utilized to identify the accessory device as, for example, "kitchen light" and/or "front door lock." The contextual data may include device association data that indicates an identifier of another device within the environment. For example, if the accessory device is located within the same room as other devices, the naming indicators of the other devices may be utilized to inform identification of the accessory device name. By way of example, if the other devices within the environment include naming indicators such as "microwave," "refrigerator," and "coffee maker," the accessory device is likely located in a kitchen and can be named accordingly, such as "kitchen light." Additionally, or alternatively, the contextual information may include device type data that may indicate a device type of the accessory device. For example, the accessory device may be a "plug," "light," "lock," etc. This information may be utilized in identifying the naming indicator for the accessory device. In addition to, or instead of, utilizing contextual information to name the accessory device, additional information may be requested from the user, such as via audio output by the voice-enabled device, and that additional information may be utilized to name the accessory device. The process 600 may include determining a naming indictor for the accessory device based at least in part on the contextual data and associating the device identifier of the accessory device with the naming indicator.

The process 600 may additionally, or alternatively, include determining that the input data indicates identification information associated with the accessory device and determining, based at least in part on the identification information, that an action is required to put the accessory device into a join mode. The process 600 may also include causing output, via the voice-enabled device, of audio representing an instruction to perform the action and receiving input data indicating that the action has been performed. In these examples, sending the directive data to the third-party remote system may be based at least in part on receiving the second input data.

The process 600 may additionally, or alternatively, include receiving, from the third-party remote system, association-status data indicating that association of the accessory device with the hub device is unsuccessful. The process 600 may also include causing output, via the voice-enabled device, of audio representing an instruction to perform an action to put the accessory device into a join mode. Input data may be received that the action has been performed, and based at least in part on receiving the input data, the process 600 may include sending the directive data again to the third-party remote system. In these examples, receiving the confirmation data from the third-party remote system may be based at least in part on sending the directive data again.

The process 600 may additionally, or alternatively, include generating directive data representing a directive to output audio confirming that the second device has been associated with the hub device and providing instructions to perform an association-check operation with accessory device. For example, audio data may be generated corresponding to audio to be output by the voice-enabled device to confirm that the association has been established. Additionally, in examples, the system, such as via one or more speechlets, may generate audio-output directive data and may send the audio-output directive data and the audio data to the voice-enabled device. The process 600 may also include sending, to the voice-enabled device, the directive data. The audio-output directive data may cause the speakers of the voice-enabled device to output audio corresponding to the audio data. For example, the output audio may be "joining complete." In examples, the audio data may also represent a request for the user to provide another user utterance to check that associate of the accessory device with the hub device was successful. For example, the output audio may include "I found a new plug called MyPlug. Try saying 'Turn off MyPlug'." The user may then provide a second user utterance to test whether the accessory device was successfully associated with the hub device and setup.

The process 600 may additionally, or alternatively, include generating directive data representing a directive to output, via the voice-enabled device, second audio requesting identification information associated with the accessory device. This operation may be based at least in part on be in response to determining that the first audio data corresponds to the request to associate the second device with the hub device. The process 600 may also include receiving, from the voice-enabled device, second audio data representing a second user utterance and determining that the second audio data represents, at least in part, the identification information. The process 600 may also include identifying, from the identification information, a device type of the accessory device and causing output, via the voice-enabled device and based at least in part on the device type, of audio representing an instruction to put the accessory device into the join mode.

The process 600 may additionally, or alternatively, include passively receiving device-association data from the third-party remote system indicating that another accessory device has been associated with the hub device and associating the other accessory device with the voice-enabled device. For example, the user may desire to initiate device association via the third-party application associated with the accessory device, hub device, and/or third-party remote system. In other examples, upon receiving the accessory device, the packaging and/or instructions associated with the accessory device may instruct the user to download and/or otherwise access the third-party application for device association with the hub device. The user may desire to follow these instructions, and in doing so, may initiate device association via a personal device. An association request may be sent from the personal device to the third-party remote system 132. Based at least in part on receiving the request, the third-party remote system may identify, determine, generate, and/or send instructions to the hub device to enter into a join mode.

The hub device may then be associated with the accessory device. For example, the user may plug the accessory device into a power source and/or otherwise install the accessory device, which may cause the accessory device to enter a join mode. In other examples, tactile input to the accessory device, such as the actuation of a button on the accessory device, may cause the accessory device to enter into the join mode. Once association of the accessory device and the hub device is complete, the accessory device may be configured to send data to and/or receive data from the hub device. The hub device may then send association confirmation data to the third-party remote system to confirm that association is complete. The association confirmation data may include a device identifier for the accessory device, such as a MAC address and/or other unique identifier.

The third-party remote system may then identify, determine, and/or generate confirmation data indicating that association of the accessory device with the hub device is complete. Additionally, in examples, the third-party remote system may identify, determine, and/or generate a naming indicator for the accessory device. For example, the device identifier of the accessory device may be utilized to determine a naming indicator for the accessory device, such as "Smart Plug," "Light 1," etc. The confirmation data and/or the device identifier and/or naming indicator may be sent from the third-party remote system to the personal device.

In addition to sending confirmation data to the personal device, the third-party remote system may also identify, determine, generate, and/or send association data and the device identifier to the remote system associated with the voice-enabled device. The sending of this data may be performed proactively, such as being requested specifically by the remote system. For example, the third-party remote system may store data indicating that the hub device is associated with the voice-enabled device. Based at least in part on this association, the third-party remote system may be configured to send the association data and/or the device identifier to the remote system.

The remote system, having received the association data and/or the device identifier may store such information and may voice enable the accessory device for operation via the voice-enabled device. The remote system may then generate audio data corresponding to audio to be output by the voice-enabled device to confirm that the pairing is complete.

Figure 7:
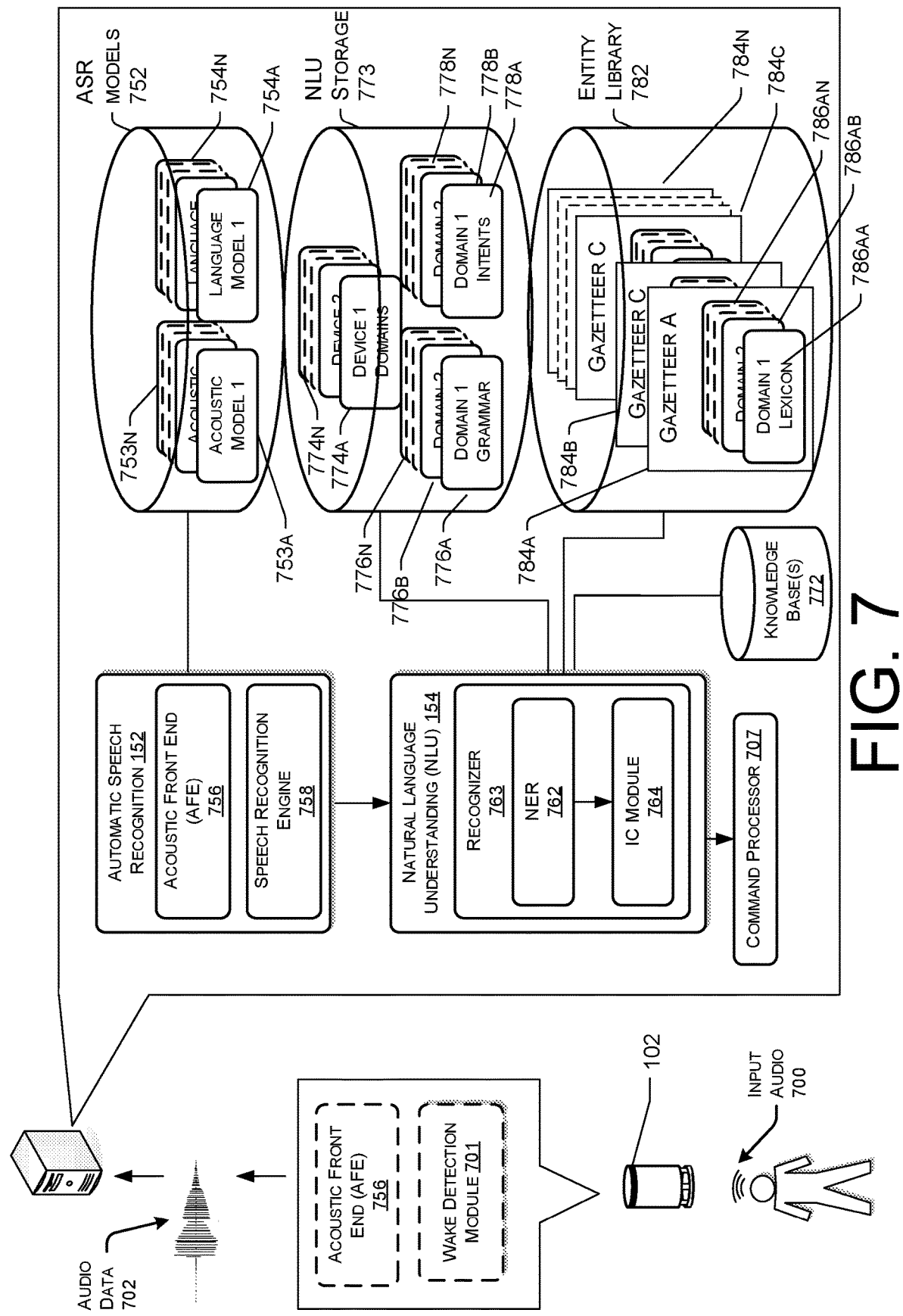
FIG. 7 illustrates a conceptual diagram of components of a natural language processing system for processing audio data provided by one or more devices.

FIG. 7 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin sending audio data to a remote system, such as system 120). The various components illustrated may be located on a same or different physical devices. Communication between various components illustrated in FIG. 7 may occur directly or across a network 136. An audio capture component, such as a microphone 112 of the device 102, or another device, captures audio 700 corresponding to a spoken utterance. The device 102 or 106, using a wakeword detection module 701, then processes audio data corresponding to the audio 700 to determine if a keyword (such as a wakeword) is detected in the audio data. Following detection of a wakeword, the device 102 or 106 sends audio data 702 corresponding to the utterance to the remote system 120 that includes an ASR module 152. The audio data 702 may be output from an optional acoustic front end (AFE) 756 located on the device prior to transmission. In other instances, the audio data 702 may be in a different form for processing by a remote AFE 756, such as the AFE 756 located with the ASR module 152 of the remote system 120.

The wakeword detection module 701 works in conjunction with other components of the user device, for example a microphone to detect keywords in audio 700. For example, the device may convert audio 700 into audio data, and process the audio data with the wakeword detection module 701 to determine whether human sound is detected, and if so, if the audio data comprising human sound matches an audio signature and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wakeword detection module 701 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection module 701 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 102 may "wake" and begin transmitting audio data 702 corresponding to input audio 700 to the remote system 120 for speech processing. Audio data corresponding to that audio may be sent to remote system 120 for routing to a recipient device or may be sent to the remote system 120 for speech processing for interpretation of the included speech (either for purposes of enabling voice-communications and/or for purposes of executing a command in the speech). The audio data 702 may include data corresponding to the wakeword, or the portion of the audio data corresponding to the wakeword may be removed by the local device 102 prior to sending. Further, a local device may "wake" upon detection of speech/spoken audio above a threshold, as described herein. Upon receipt by the remote system 120, an ASR module 152 may convert the audio data 702 into text. The ASR transcribes audio data into text data representing the words of the speech contained in the audio data 702. The text data may then be used by other components for various purposes, such as executing system commands, inputting data, etc. A spoken utterance in the audio data is input to a processor configured to perform ASR which then interprets the utterance based on the similarity between the utterance and pre-established language models 754 stored in an ASR model knowledge base (ASR Models Storage 752). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 753 stored in an ASR Models Storage 752), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 152 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 756 and a speech recognition engine 758. The acoustic front end (AFE) 756 transforms the audio data from the microphone into data for processing by the speech recognition engine 758. The speech recognition engine 758 compares the speech recognition data with acoustic models 753, language models 754, and other data models and information for recognizing the speech conveyed in the audio data. The AFE 756 may reduce noise in the audio data and divide the digitized audio data into frames representing time intervals for which the AFE 756 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 758 may process the output from the AFE 756 with reference to information stored in speech/model storage (752). Alternatively, post front-end processed data (such as feature vectors) may be received by the device executing ASR processing from another source besides the internal AFE. For example, the user device may process audio data into feature vectors (for example using an on-device AFE 756) and transmit that information to a server across a network for ASR processing. Feature vectors may arrive at the remote system 120 encoded, in which case they may be decoded prior to processing by the processor executing the speech recognition engine 758.

The speech recognition engine 758 attempts to match received feature vectors to language phonemes and words as known in the stored acoustic models 753 and language models 754. The speech recognition engine 758 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Alexa, discover my devices" or "Alexa, pair my new smart plug." The wake detection module may identify the wake word, otherwise described as a trigger expression, "Alexa," in the user utterance and may "wake" based on identifying the wake word. Audio data corresponding to the user utterance may be sent to the remote system 120, where the speech recognition engine 758 may identify, determine, and/or generate text data corresponding to the user utterance, here "discover my devices" or "pair my new smart plug."

The speech recognition engine 758 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 758 to other processing components, which may be local to the device performing ASR and/or distributed across the network(s). For example, ASR results in the form of a single textual representation of the speech, an N-best list including multiple hypotheses and respective scores, lattice, etc. may be sent to the remote system 120, for natural language understanding (NLU) processing, such as conversion of the text into commands for execution, either by the user device, by the remote system 120, or by another device (such as a server running a specific application like a search engine, etc.).

The device performing NLU processing 154 (e.g., server 120) may include various components, including potentially dedicated processor(s), memory, storage, etc. As shown in FIG. 7, an NLU component 154 may include a recognizer 763 that includes a named entity recognition (NER) module 762 which is used to identify portions of query text that correspond to a named entity that may be recognizable by the system. A downstream process called named entity resolution links a text portion to a specific entity known to the system. To perform named entity resolution, the system may utilize gazetteer information (784a-784n) stored in entity library storage 782. The gazetteer information may be used for entity resolution, for example matching ASR results with different entities (such as hub devices, accessory devices, etc.) Gazetteers may be linked to users (for example a particular gazetteer may be associated with a specific user's device associations), may be linked to certain domains (such as pairing), or may be organized in a variety of other ways.

Generally, the NLU process takes textual input (such as processed from ASR 152 based on the utterance input audio 700) and attempts to make a semantic interpretation of the text. That is, the NLU process determines the meaning behind the text based on the individual words and then implements that meaning. NLU processing 154 interprets a text string to derive an intent or a desired action from the user as well as the pertinent pieces of information in the text that allow a device (e.g., device 102) to complete that action. For example, if a spoken utterance is processed using ASR 152 and outputs the text "discover my devices" the NLU process may determine that the user intended to associate an accessory device with a hub device associated with voice-enabled device.

The NLU may process several textual inputs related to the same utterance. For example, if the ASR 152 outputs N text segments (as part of an N-best list), the NLU may process all N outputs to obtain NLU results.

As will be discussed further below, the NLU process may be configured to parse and tag to annotate text as part of NLU processing. For example, for the text "discover my new smart plug," "discover" may be tagged as a command (to association an accessory device with a hub device) and "new smart plug" may be tagged as the accessory device to be paired.

To correctly perform NLU processing of speech input, an NLU process 154 may be configured to determine a "domain" of the utterance so as to determine and narrow down which services offered by the endpoint device (e.g., remote system 120 or the user device) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) module 762 receives a query in the form of ASR results and attempts to identify relevant grammars and lexical information that may be used to construe meaning. To do so, the NLU module 154 may begin by identifying potential domains that may relate to the received query. The NLU storage 773 includes a database of devices (774a-774n) identifying domains associated with specific devices. For example, the user device may be associated with domains for music, telephony, calendaring, contact lists, and device-specific communications, but not video. In addition, the entity library may include database entries about specific services on a specific device, either indexed by Device ID, User ID, or Household ID, or some other indicator.

In NLU processing, a domain may represent a discrete set of activities having a common theme, such as "pairing," "shopping," "music," "calendaring," etc. As such, each domain may be associated with a particular recognizer 763, language model and/or grammar database (776a-776n), a particular set of intents/actions (778a-778n), and a particular personalized lexicon (786). Each gazetteer (784a-784n) may include domain-indexed lexical information associated with a particular user and/or device. For example, the Gazetteer A (784a) includes domain-index lexical information 786aa to 786an. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both communications and, for example, music, the query may, substantially in parallel, be NLU processed using the grammar models and lexical information for communications, and will be processed using the grammar models and lexical information for music. The responses based on the query produced by each set of models is scored, with the overall highest ranked result from all applied domains ordinarily selected to be the correct result.

An intent classification (IC) module 764 parses the query to determine an intent or intents for each identified domain, where the intent corresponds to the action to be performed that is responsive to the query. Each domain is associated with a database (778a-778n) of words linked to intents. For example, a music intent database may link words and phrases such as "quiet," "volume off," and "mute" to a "mute" intent. By way of further example, a timer intent database may link words and phrases such as "set," "start," "initiate," and "enable" to a "set timer" intent. A voice-message intent database, meanwhile, may link words and phrases such as "send a message," "send a voice message," "send the following," or the like. A pairing intent database, meanwhile, may link words and phrases such as "pairing devices," "link devices," and "discover devices," or the like. The IC module 764 identifies potential intents for each identified domain by comparing words in the query to the words and phrases in the intents database 778. In some instances, the determination of an intent by the IC module 764 is performed using a set of rules or templates that are processed against the incoming text to identify a matching intent.

In order to generate a particular interpreted response, the NER 762 applies the grammar models and lexical information associated with the respective domain to actually recognize a mention of one or more entities in the text of the query. In this manner, the NER 762 identifies "slots" or values (i.e., particular words in query text) that may be needed for later command processing. Depending on the complexity of the NER 762, it may also label each slot with a type of varying levels of specificity (such as noun, place, city, artist name, song name, amount of time, timer number, or the like). Each grammar model 776 includes the names of entities (i.e., nouns) commonly found in speech about the particular domain (i.e., generic terms), whereas the lexical information 786 from the gazetteer 784 is personalized to the user(s) and/or the device. For instance, a grammar model associated with the shopping domain may include a database of words commonly used when people discuss shopping.

The intents identified by the IC module 764 are linked to domain-specific grammar frameworks (included in 776) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "discover devices for My Hub Device" is an identified intent, a grammar (776) framework or frameworks may correspond to sentence structures such as "pair {accessory device} with {My Hub Device}."

For example, the NER module 762 may parse the query to identify words as subject, object, verb, preposition, etc., based on grammar rules and/or models, prior to recognizing named entities. The identified verb may be used by the IC module 764 to identify intent, which is then used by the NER module 762 to identify frameworks. A framework for the intent of "play a song," meanwhile, may specify a list of slots/fields applicable to play the identified "song" and any object modifier (e.g., specifying a music collection from which the song should be accessed) or the like. The NER module 762 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER module 762 may search the database of generic words associated with the domain (in the knowledge base 772). So, for instance, if the query was "discover my devices," after failing to determine which hub device to association an accessory device with, the NER component 762 may search the domain vocabulary for the phrase "hub device" or "hub." In the alternative, generic words may be checked before the gazetteer information, or both may be tried, potentially producing two different results.

The output data from the NLU processing (which may include tagged text, commands, etc.) may then be sent to a command processor 707. The destination command processor 707 may be determined based on the NLU output. For example, if the NLU output includes a command to send a message, the destination command processor 707 may be a message sending application, such as one located on the user device or in a message sending appliance, configured to execute a message sending command. If the NLU output includes a search request, the destination command processor 707 may include a search engine processor, such as one located on a search server, configured to execute a search command. After the appropriate command is generated based on the intent of the user, the command processor 707 may provide some or all of this information to a text-to-speech (TTS) engine 158. The TTS engine 158 may then generate an actual audio file for outputting the audio data determined by the command processor 707 (e.g., "pairing successful," or "try saying 'turn off MyPlug'"). After generating the file (or "audio data"), the TTS engine 158 may provide this data back to the remote system 120.

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 154 during runtime operations where NLU operations are performed on text (such as text output from an ASR component 152). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 763. Each recognizer may include various NLU components such as an NER component 762, IC module 764 and other components such as an entity resolver, or other components.

For example, a messaging domain recognizer 763-A (Domain A) may have an NER component 762-A that identifies what slots (i.e., portions of input text) may correspond to particular words relevant to that domain. The words may correspond to entities such as (for the messaging domain) a recipient. An NER component 762 may use a machine learning model, such as a domain specific conditional random field (CRF) to both identify the portions corresponding to an entity as well as identify what type of entity corresponds to the text portion. The messaging domain recognizer 763-A may also have its own intent classification (IC) component 764-A that determines the intent of the text assuming that the text is within the proscribed domain. An IC component may use a model, such as a domain specific maximum entropy classifier to identify the intent of the text, where the intent is the action the user desires the system to perform. For this purpose, the remote system computing device 120 may include a model training component. The model training component may be used to train the classifier(s)/machine learning models discussed above.

As noted above, multiple devices may be employed in a single speech processing system. In such a multi-device system, each of the devices may include different components for performing different aspects of the speech processing. The multiple devices may include overlapping components. The components of the user device and the remote system 120, as illustrated herein are exemplary, and may be located in a stand-alone device or may be included, in whole or in part, as a component of a larger device or system, may be distributed across a network or multiple devices connected by a network, etc.

Figure 8:
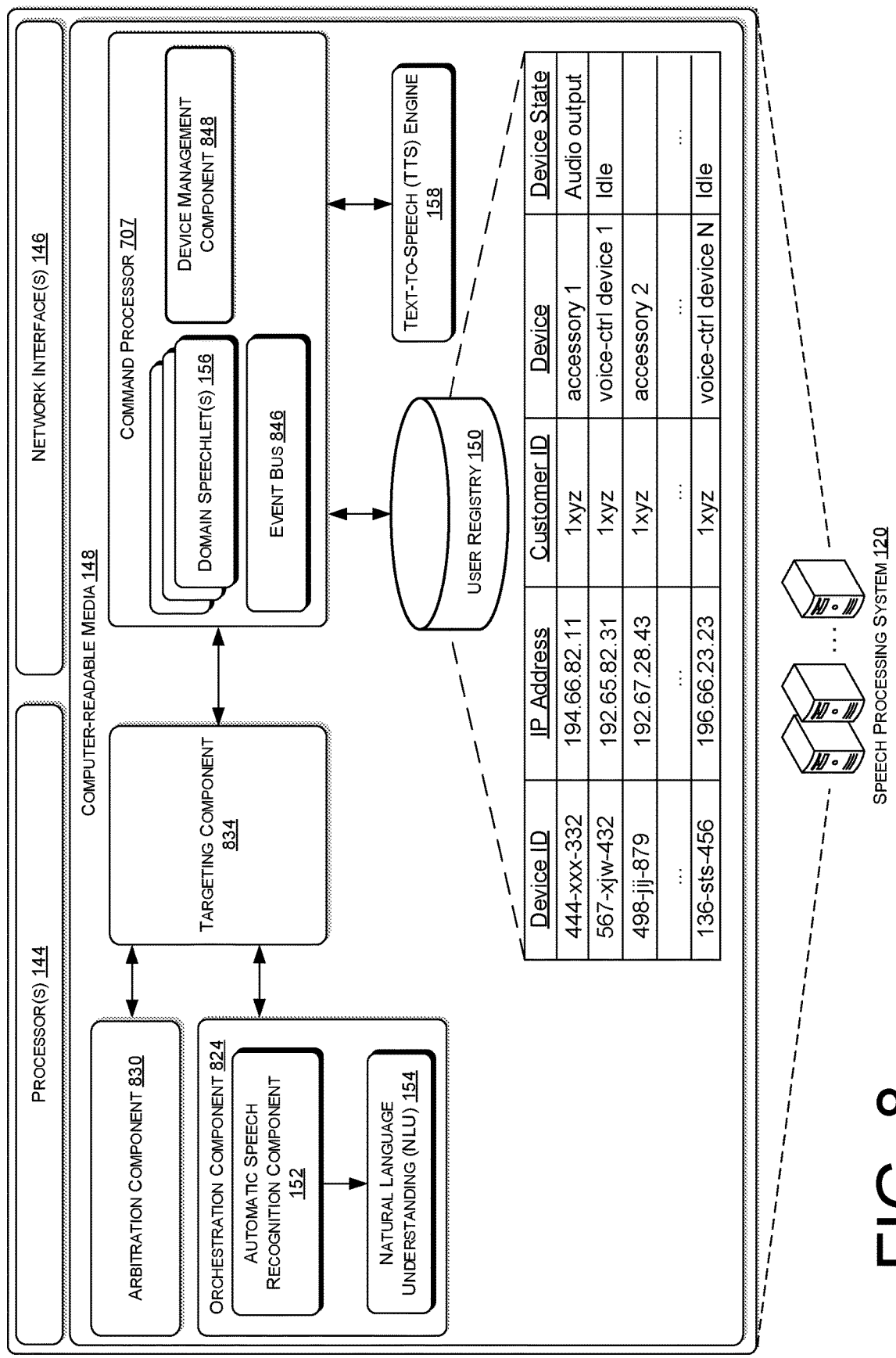
FIG. 8 illustrates a conceptual diagram of components of a natural language processing system associating join commands with devices and systems.

FIG. 8 illustrates a conceptual diagram of components of a speech processing system 120 associating audio output commands with multiple devices, including a command processor 707 configured to generate a command that the selected voice-enabled device uses to respond to a user utterance. As used with respect to FIG. 8, a voice-enabled device may include a voice-enabled device, such as the voice-enabled device 102 from FIG. 1. As illustrated in FIG. 8, the speech processing system 120, including the orchestration component 824 comprising the ASR component 152 and the NLU component 154, may be coupled to the targeting component 834 and provide the targeting component 834 with the intent determined to be expressed in the user utterance. Further, the arbitration component 830 may provide the ranked list of devices to the targeting component 834, as well as device indicators (e.g., IP addresses, devices names, etc.) for one or more of the voice-enabled devices in the ranked list of devices. The targeting component 834 may then perform techniques to determine a target device (e.g., a device to perform the requested operation), and provide various data to the command processor 707. For instance, the targeting component 834 may provide the command processor 707 with various device identifiers of the voice-enabled devices, the determined target device, the determined intent and/or command, etc. By way of example, the targeting component 834 may determine which devices to add to a grouping of device, which devices to remove from a grouping of devices, and/or which devices to move an audio-session to. The association and dissociation of device states and/or audio-session queues using the targeting component 834 is described in more detail with respect to FIG. 1, above.

The command processor 707 and/or NLU component 154 may determine a domain based on the intent and, based on this determination, route the request corresponding to the audio data to the appropriate domain speechlet, such as the illustrated domain speechlets 156. The domain speechlet 156 may comprise any type of device or group of devices (e.g., hardware device, virtual devices or partitions, server, etc.), and may receive the text data and/or an intent associated with the audio signals and may determine how to respond to the request. For instance, the intent for a command "discover devices" may be routed to a pairing domain speechlet 156, which controls generation of directive data for sending to third-party remote systems to associate accessory devices and hub devices.

Various types of domain speechlets 156 may be used to determine which devices to send commands to and/or to use in response to a user utterance, as well as the appropriate response and potential additional content (e.g., audio data). For example, the domain speechlets 156 may include a third party skills domain speechlet 156, which may handle intents associated with gaming, productivity, etc., a music domain speechlet 156, which may handle intents associated with music play requests (e.g., Amazon Music, Pandora, Spotify, iHeart, etc.), and/or an information domain speechlet 156, which may handle requests for information associated, for example, with the status of a particular device and/or content being utilized and/or output by a particular device and/or group of devices.

After the domain speechlet 156 generates the appropriate command, which may be described herein as directive data, based on the intent of the user, and/or provides additional content, such as audio data, to be output by one of the voice-enabled devices, the domain speechlet 156 may provide this information back to the speech system 120, which in turns provides some or all of this information to a text-to-speech (TTS) engine 158 and/or to a third-party remote system for device-pairing purposes. The TTS engine 158 then generates an actual audio file for outputting the second audio data determined by the domain speechlet 156. After generating the file (or "audio data"), the TTS engine 158 may provide this data back to the speech system 120.

The speech system 120 may then publish (i.e., write) some or all of this information to an event bus 846. That is, the speech system 120 may provide information regarding the initial request (e.g., the speech, the text, the domain/intent, etc.), the response to be provided to the voice-enabled device, or any other information pertinent to the interaction between the voice-enabled device and the speech processing system 120 to the event bus 846.

Within the speech processing system 120, one or more components or services may subscribe to the event bus 846 so as to receive information regarding interactions between user devices and the speech processing system 120. In the illustrated example, for instance, the device management component 848 may subscribe to the event bus 846 and, thus, may monitor information regarding these interactions. In some examples, monitoring information in the event bus 846 may comprise communications between various components of the speech processing system 120. For example, the targeting component 834 may monitor the event bus 846 to identify device state data for voice-enabled devices. In some examples, the event bus 846 may "push" or send indications of events and/or device state data to the targeting component 834. Additionally, or alternatively, the event bus 846 may be "pulled" where the targeting component 834 sends requests to the event bus 846 to provide an indication of device state data for a voice-enabled device. The event bus 846 may store indications of the device states for the devices, such as in a database (e.g., user registry 150), and using the stored indications of the device states, send the device state data for voice-enabled devices to the targeting component 834. Thus, to identify device state data for a device, the targeting component 834 may send a request to the event bus 846 (e.g., event component) to provide an indication of the device state data associated with a device, and receive, from the event bus 846, the device state data that was requested.

The device management component 848 functions to monitor information published to the event bus 846 and identify events that may trigger action. For instance, the device management component 848 may identify (e.g., via filtering) those events that: (i) come from voice-enabled devices that are associated with secondary device(s) (e.g., have secondary devices in their environments such as televisions, personal computing devices, accessory devices, etc.), and (ii) are associated with supplemental content (e.g., image data, video data, etc.). The device management component 848 may reference the user registry 150 to determine which voice-enabled devices are associated with secondary devices, as well as determine device types, states, and other capabilities of these secondary devices. For instance, the device management component 848 may determine, from the information published to the event bus 846, an identifier associated with the voice-enabled device making the corresponding request or the voice-enabled device selected to respond to or act upon the user utterance. The device management component 848 may use this identifier to identify, from the user registry 150, a user account associated with the voice-enabled device. The device management component 848 may also determine whether any secondary devices have been registered with the identified user account, as well as capabilities of any such secondary devices, such as how the secondary devices are configured to communicate (e.g., via WiFi, short-range wireless connections, etc.), the type of content the devices are able to output (e.g., audio, video, still images, flashing lights, etc.), and the like.

The device management component 848 may determine whether a particular event identified is associated with supplemental content. That is, the device management component 848 may write, to a datastore, indications of which types of events and/or which primary content or responses are associated with supplemental content. In some instances, the speech processing system 120 may provide access to third-party developers to allow the developers to register supplemental content for output on secondary devices for particular events and/or primary content. For example, if a voice-enabled device is to output that the weather will include thunder and lightning, the device management component 848 may store an indication of supplemental content such as thunder sounds, pictures/animations of lightning and the like. In another example, if a voice-enabled device is outputting information about a particular fact (e.g., "a blue whale is the largest mammal on earth . . . "), then a secondary device, such as television, may be configured to provide supplemental content such as a video or picture of a blue whale. In another example, if a voice-enabled device is outputting audio, then a second device, such as a speaker, may be configured to also output the audio based at least in part on a user utterance representing a request to add the secondary device to the audio session. In these and other examples, the device management component 848 may store an association between the primary response or content (e.g., outputting of information regarding the world's largest mammal) and corresponding supplemental content (e.g., the audio data, image data, or the like). In some instances, the device management component 848 may also indicate which types of secondary devices are to output which supplemental content. For instance, in the instant example, the device management component 848 may store an indication that secondary devices of a class type "tablet" are to output a picture of a blue whale. In these and other instances, meanwhile, the device management component 848 may store the supplemental content in association with secondary-device capabilities (e.g., devices with speakers output the audio commentary, devices with screens output the image, etc.).

The device management component 848 may also determine how to transmit response and/or supplement content (and/or information acquiring the content) to the voice-enabled devices and/or the secondary devices. To make this determination, the device management component 848 may determine a device type of the voice-enabled devices and/or secondary devices, capabilities of the device(s), or the like, potentially as stored in the user registry 150. In some instances, the device management component 848 may determine that a particular device is able to communicate directly with the speech processing system 120 (e.g., over WiFi) and, thus, the device management component 848 may provide the response and/or content directly over a network 122 to the secondary device (potentially via the speech system 120). In another example, the device management component 848 may determine that a particular secondary device is unable to communicate directly with the speech processing system 120, but instead is configured to communicate with a voice-enabled device in its environment over short-range wireless networks. As such, the device management component 848 may provide the supplement content (or information) to the speech system 120, which in turn may send this to the voice-enabled device, which may send the information over a short-range network to the secondary device.

The computer-readable media 148 may further include the user registry 150, also described as the user profile/account component 148 with respect to FIG. 1, that includes data regarding user profiles as described herein. The user registry 150 may be located part of, or proximate to, the speech processing system 120, or may otherwise be in communication with various components, for example over the network 122. The user registry 150 may include a variety of information related to individual users, accounts, etc. that interact with the voice-enabled devices, and the speech processing system 120. For illustration, the user registry 150 may include data regarding the devices associated with particular individual user profiles. Such data may include user or device identifier (ID) and internet protocol (IP) address information for different devices as well as names by which the devices may be referred to by a user. Further qualifiers describing the devices may also be listed along with a description of the type of object of the device. Further, the user registry 150 may store indications of associations between various voice-enabled devices and/or secondary device, such as virtual clusters of devices, states of devices, and associations between devices and audio-session queues. The user registry 150 may represent clusters of devices and/or as single devices that can receive commands and disperse the commands to each device and/or in the cluster. In some examples, the virtual cluster of devices may be represented as a single device which is determined as being capable, or not capable (e.g., offline), of performing a command in a user utterance. A virtual cluster of devices may generally correspond to a stored grouping of devices, or a stored association between a group of devices.

In some examples, the device state for devices associated with a user account may indicate a current state of the device. In this way, the command processor 707 and/or the domain speechlets 156 may determine, based on the stored device states in the user registry 150, a current device state of the voice-enabled devices. Rather than receiving device states for the voice-enabled devices, in metadata, the device states may already have been determined or received and stored in the user registry 150. Further, the user registry 150 may provide indications of various permission levels depending on the user. As an example, the speech system 120 may perform speaker recognition on audio signals to determine an identity of the speaker. If the speaker is a child, for instance, the child profile may have permission restrictions where they are unable to request audio to be output via certain devices and/or to output certain audio on one or more of the devices, for example. Conversely, a parent profile may be able to direct output of audio without restrictions.

In some examples, to determine the device state, the event bus 846 may publish different events which indicate device states to various entities or components that subscribe to the event bus 846. For instance, if an event of "discover devices" occurs for a voice-enabled device, the event bus 846 may publish the indication of this event, and thus the device state of pairing devices may be determined for the voice-enabled device. Thus, various components, such as the targeting component 834, may be provided with indications of the various device states via the event bus 846. The event bus 846 may further store and/or update device states for the voice-enabled devices in the user registry 150. The components of the speech processing system 120 may query the user registry 150 to determine device states.

A particular user profile may include a variety of data that may be used by the system 120. For example, a user profile may include information about what voice-enabled devices are associated with the user and/or user profile. The user profile may further indicate an IP address for each of the devices associated with the user and/or user profile, user IDs for the devices, indications of the types of devices, and current device states for the devices.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
   one or more processors; and
   non-transitory computer-readable media storing computer-executable instructions that, when executed by the one or more processors, cause the one or more processors to perform operations comprising:
      receiving, from a voice-controlled device, audio data representing a user utterance;
      determining that the audio data corresponds to a request to associate an accessory device with a hub device;
      determining that a hub-associated skill is enabled for use with the voice-enabled device;
      generating, in response to determining that the hub-associated skill is enabled, first directive data representing a first directive to associate the accessory device with the hub device;
      sending, to a remote system associated with the hub device, the first directive data to cause the remote system to instruct the hub device to transition to a join mode;
      receiving, from the remote system, confirmation data indicating that the accessory device was successfully associated with the hub device;
      generating second directive data representing a second directive to output audio:
         that confirms the accessory device has been associated with the hub device; and
         requests that an association-check operation be performed by a user; and
      sending, to the voice-enabled device, the second directive data.

2. The system of claim 1, wherein the hub device is a first hub device, the audio comprises first audio, the audio data comprises first audio data, the user utterance comprises a first user utterance, and the operations further comprising:
   identifying a second hub device associated with the voice-enabled device;
   sending, to the voice-enabled device, third directive data representing a third directive to output second audio representing a request to select between the first hub device and the second hub device for associating with the accessory device;
   receiving, from the voice-enabled device, second audio data representing a second user utterance;
   determining that the second user utterance corresponds to a response indicating the accessory device is to be associated with the first hub device; and
   wherein generating the first directive data is based on determining that the second user utterance corresponds to the response indicating the accessory device is to be associated with the first hub device.

3. The system of claim 1, the operations further comprising:
   receiving, from the remote system, accessory-device identification data indicating a device identifier of the accessory device;
   receiving contextual data associated with the accessory device, the contextual data comprising at least one of:
      device-location data indicating a location of the accessory device within an environment;
      device-association data indicating an identifier of another device within the environment; or
      device-type data indicating a device type of the accessory device;
   determining a naming indicator for the accessory device based on the contextual data; and
   associating the device identifier of the accessory device with the naming indicator.

4. The system of claim 1, wherein the audio data comprises first audio data, the audio comprises first audio, the user utterance comprises a first user utterance, and the operations further comprising:
   in response to determining that the first audio data corresponds to the request to associate the accessory device with the hub device, generating third directive data representing a third directive to output, via the voice-enabled device, second audio requesting identification information associated with the accessory device;
   receiving, from the voice-enabled device, second audio data representing a second user utterance;
   determining that the second audio data represents, at least in part, the identification information;
   identifying, from the identification information, a device type of the accessory device; and
   causing output, via the voice-enabled device and based on the device type, of third audio representing a request to put the accessory device into the join mode.

5. A method, comprising:
   receiving, from a first device, input data indicating a request to associate a second device with a hub device;
   determining that hub-associated functionality is enabled for use with the first device;
   generating, based at least in part on determining that the hub-associated functionality is enabled, directive data representing a directive to associate the second device with the hub device;
   sending, to a remote system associated with the hub device, the directive data to cause the remote system to instruct the hub device to transition to a mode to enable associating the second device with the hub device; and
   receiving, from the remote system, confirmation data indicating that the second device has been associated with the hub device.

6. The method of claim 5, wherein the hub device is a first hub device, the directive data comprises first directive data, the directive comprises a first directive, the input data comprises first input data, the request comprises a first request, and further comprising:
   identifying a second hub device associated with the first device;
   sending, to the first device, second directive data representing a second directive to output audio representing a second request to select between the first hub device and the second hub device for associating with the second device;
   receiving, from the first device, second input data representing a response to the second request;
   determining that the response indicates that the second device is to be associated with the first hub device; and
   wherein generating the first directive data is based at least in part on determining that the response indicates that the second device is to be associated with the first hub device.

7. The method of claim 5, wherein the directive data comprises first directive data, the directive comprising a first directive, and further comprising:
   receiving, from the remote system, a naming indicator of the second device;
   generating second directive data representing a second directive to output audio:

indicating the naming indicator; and
requesting performance of a pairing-check operation with the second device; and
sending the second directive data to the first device.

8. The method of claim 5, further comprising:
receiving, from the remote system, device-identification data indicating a device identifier of the second device;
receiving contextual data associated with the second device, the contextual data comprising at least one of:
device-location data indicating a location of the second device within an environment;
device-association data indicating an identifier of a third device within the environment; or
device-type data indicating a device type of the accessory device;
determining a naming indicator for the second device based at least in part on the contextual data; and
associating the device identifier of the second device with the naming indicator.

9. The method of claim 5, wherein the input data comprises first input data, the request comprises a first request, and further comprising:
determining that the first input data indicates identification information associated with the second device;
determining, based at least in part on the identification information, that an action is required to put the second device into a join mode;
causing output, via the first device, of audio representing a second request to perform the action;
receiving second input data indicating that the action has been performed; and
wherein sending the directive data is based at least in part on receiving the second input data.

10. The method of claim 5, wherein the directive data comprises a first instance of the directive data, the request comprises a first request, and further comprising:
based at least in part on sending the first instance of the directive data, receiving, from the remote system, association-status data indicating that association of the second device with the hub device is unsuccessful;
causing output, via the first device, of audio representing a second request to perform an action to put the second device into a join mode;
receiving second input data indicating that the action has been performed;
sending, based at least in part on receiving the second input data and to the remote system, a second instance of the directive data; and
wherein receiving the confirmation data is based at least in part on sending the second instance of the directive data.

11. The method of claim 5, wherein the directive data comprises first directive data, the directive comprises a first directive, and further comprising:
generating second directive data representing a second directive to output audio:
that confirms the second device has been associated with the hub device; and
that requests a user to perform a pairing-check operation with the second device; and
sending, to the first device, the second directive data.

12. The method of claim 5, wherein the input data comprises first input data, the directive data comprising first directive data, the directive comprising a first directive, the request comprises a first request, and further comprising:
in response to determining that the first input data corresponds to the first request to associate the second device with the hub device, generating second directive data representing a second directive to present, via the first device, a second request for identification information associated with the second device;
receiving, from the first device, second input data representing a response to the second request;
determining that the response includes, at least in part, the identification information;
identifying, from the identification information, a device type of the second device; and
causing presentation, via the first device and based at least in part on the device type, of a third request to put the second device into a join mode.

13. A system, comprising:
one or more processors; and
non-transitory computer-readable media storing computer-executable instructions that, when executed by the one or more processors, cause the one or more processors to perform operations comprising:
receiving, from a first device, input data indicating a request to associate a second device with a hub device;
determining that hub-associated functionality is enabled for use with the first device;
generating, based at least in part on determining that the hub-associated functionality is enabled, directive data representing a directive to associate the second device with the hub device;
sending, to a remote system associated with the hub device, the directive data to cause the remote system to instruct the hub device to transition to a mode to enable associating the second device with the hub device; and
receiving, from the remote system, confirmation data indicating that the second device has been associated with the hub device.

14. The system of claim 13, wherein the hub device is a first hub device, the directive data comprises first directive data, the directive comprises a first directive, the input data comprises first input data, the request comprises a first request, and the operations further comprising:
identifying a second hub device associated with the first device;
sending, to the first device, second directive data representing a second directive to output audio representing a second request to select between the first hub device and the second hub device for associating with the second device;
receiving, from the first device, second input data representing a response to the second request;
determining that the response indicates that the second device is to be associated with the first hub device; and
wherein generating the first directive data is based at least in part on determining that the response indicates that the second device is to be associated with the first hub device.

15. The system of claim 13, wherein the directive data comprises first directive data, the directive comprising a first directive, and the operations further comprising:
receiving, from the remote system, a naming indicator of the second device;
generating second directive data representing a second directive to output audio:
including the naming indicator; and
requesting performance of a pairing-check operation with the second device; and
sending the second directive data to the first device.

16. The system of claim 13, the operations further comprising:
receiving, from the remote system, device-identification data indicating a device identifier of the second device;
receiving contextual data associated with the second device, the contextual data comprising at least one of:
device-location data indicating a location of the second device within an environment;
device-association data indicating an identifier of a third device within the environment; or
device-type data indicating a device type of the accessory device;
determining a naming indicator for the second device based at least in part on the contextual data; and
associating the device identifier of the second device with the naming indicator.

17. The system of claim 13, wherein the input data comprises first input data, the request comprises a first request, and the operations further comprising:
determining that the first input data indicates identification information associated with the second device;
determining, based at least in part on the identification information, that an action is required to put the second device into a join mode;
causing output, via the first device, of audio representing a second request to perform the action;
receiving second input data indicating that the action has been performed; and
wherein sending the directive data is based at least in part on receiving the second input data.

18. The system of claim 13, wherein the directive data comprises a first instance of the directive data, the request comprises a first request, and the operations further comprising:
based at least in part on sending the first instance of the directive data, receiving, from the remote system, association-status data indicating that association of the second device with the hub device is unsuccessful;
causing output, via the first device, of audio representing a second request to perform an action to put the second device into a join mode;
receiving second input data indicating that the action has been performed;
sending, based at least in part on receiving the second input data and to the remote system, a second instance of the directive data; and
wherein receiving the confirmation data is based at least in part on sending the second instance of the directive data.

19. The system of claim 13, wherein the directive data comprises first directive data, the directive comprises a first directive, and the operations further comprising:
generating second directive data representing a second directive to output audio:
that confirms the second device has been associated with the hub device; and
that request a user to perform a pairing-check operation with the second device; and
sending, to the first device, the second directive data.

20. The system of claim 13, the operations further comprising:
receiving, from the remote system, device-association data indicating that a third device has been associated with the hub device; and
associating, based at least in part on receiving the device-association data, the third device with the first device.

* * * * *